United States Patent
Brackin et al.

(12) 
(10) Patent No.: US 6,354,978 B1
(45) Date of Patent: Mar. 12, 2002

(54) DIFFERENTIAL AND METHOD FOR VARIABLE TRACTION CONTROL

(75) Inventors: John F. Brackin, Mequon; Edward Freier, Jr., West Bend, both of WI (US)

(73) Assignee: Simplicity Manufacturing, Inc., Port Washington, WI (US)

( * ) Notice: Subject to any disclaimer, the term of this patent is extended or adjusted under 35 U.S.C. 154(b) by 0 days.

(21) Appl. No.: 09/426,506

(22) Filed: Oct. 26, 1999

(51) Int. Cl.[7] .............................................. F16H 48/06
(52) U.S. Cl. ........................................ 475/234; 475/237
(58) Field of Search ................................ 475/234, 237, 475/238, 239

(56) References Cited

U.S. PATENT DOCUMENTS

| | | | | |
|---|---|---|---|---|
| 964,387 A | * | 7/1910 | Burnam | 475/238 |
| 1,033,511 A | * | 7/1912 | Zimmerman | 475/236 |
| 1,212,795 A | * | 1/1917 | Mayer et al. | 475/234 |
| 1,324,855 A | | 12/1919 | Taylor | |
| 1,324,857 A | | 12/1919 | Taylor | |
| 1,341,276 A | | 5/1920 | MacDonald | |
| 1,355,297 A | * | 10/1920 | Woodward | 475/237 |
| 2,209,966 A | | 8/1940 | Goeller | |
| 2,354,214 A | | 7/1944 | Lockwood | |
| 2,559,944 A | * | 7/1951 | Chapp | 475/236 |
| 2,566,601 A | | 9/1951 | Cousins | |
| 2,680,972 A | | 6/1954 | Tone | |
| 2,771,791 A | | 11/1956 | Bachman | |
| 2,774,253 A | | 12/1956 | Minard et al. | |
| 2,775,141 A | | 12/1956 | Ronning | |
| 2,785,369 A | | 3/1957 | Ligh | |
| 2,966,076 A | | 12/1960 | O'Brien | |
| 2,985,035 A | | 5/1961 | Toth | |
| 3,060,765 A | | 10/1962 | Rinsoz | |
| 3,097,545 A | | 7/1963 | Immel | |
| 3,186,258 A | | 6/1965 | Meldola | |
| 3,233,477 A | | 2/1966 | O'Brien | |

(List continued on next page.)

FOREIGN PATENT DOCUMENTS

| | | |
|---|---|---|
| FR | 1255153 | 1/1961 |
| GB | 2188382 | 3/1987 |
| GB | 2216613 | 2/1989 |

* cited by examiner

Primary Examiner—Dirk Wright
(74) Attorney, Agent, or Firm—Michael Best & Friedrich LLP

(57) ABSTRACT

A differential having variable traction control and permitting preferably infinite planet or side gear braking adjustment during differential operation. In some preferred embodiments, an actuation element is movable during differential operation to exert braking force upon a side or planet gear. The braking force can be exerted directly or indirectly upon a gear surface by a braking element. The amount of braking force is preferably controlled via the actuation element through a range of positions. The actuation element is preferably a lever or similar element movable either to drive a brake element in harder or lighter frictional engagement with a planet or side gear or to drive a planet or side gear in harder or lighter frictional engagement with a brake element. Alternatively, the actuation element can be a set of cables movable to actuate a brake element. In other embodiments, actuation of the brake elements is inherently generated by differential operation. The brake element actuated by the actuator can be a brake pad located between the differential housing and the side or planet gear for generating braking force when sandwiched therebetween, a wedge-shaped brake block which can be wedged between two planet gears, a cone clutch element mating with the planet or side gears, a band brake fitted around an axle, a surface or portion of an element thrust into abutting relationship with the gear by the actuation element, or a friction element against which the gears press when moved by the actuation element.

22 Claims, 17 Drawing Sheets

U.S. PATENT DOCUMENTS

| | | |
|---|---|---|
| 3,260,134 A | 7/1966 | Bowen et al. |
| 3,264,900 A | 8/1966 | Hartupee |
| 3,308,685 A | 3/1967 | Wojcikowski |
| 3,326,064 A | 6/1967 | Ordorica, Jr. |
| 3,334,702 A | 8/1967 | Granryd |
| 3,342,084 A | 9/1967 | Randall |
| 3,403,582 A | 10/1968 | Morden |
| 3,438,282 A | 4/1969 | Thornton |
| 3,523,467 A | 8/1970 | Schacter |
| 3,528,323 A | 9/1970 | Kamlukin |
| 3,657,935 A | 4/1972 | O'Brien |
| 3,748,869 A | 7/1973 | Orain |
| 3,777,837 A | 12/1973 | Harper |
| 3,815,443 A | 6/1974 | McAninch et al. |
| 3,837,236 A | 9/1974 | Kagata |
| 3,963,977 A | 6/1976 | Mitsui |
| 4,093,054 A | 6/1978 | Johns |
| 4,245,525 A | 1/1981 | LeBegue |
| 4,248,331 A | 2/1981 | Behrens |
| 4,290,321 A | 9/1981 | Wilson |
| 4,305,313 A | 12/1981 | Konkle |
| 4,320,813 A | 3/1982 | Manna |
| 4,332,314 A | 6/1982 | Flotow |
| 4,383,352 A | 5/1983 | Flotow et al. |
| 4,432,431 A | 2/1984 | Russell |
| 4,440,035 A | 4/1984 | Foulk |
| 4,526,063 A | 7/1985 | Oster |
| 4,611,504 A | 9/1986 | Rundle |
| 4,632,235 A | 12/1986 | Flotow et al. |
| 4,651,847 A | 3/1987 | Hermanns |
| 4,688,447 A | 8/1987 | Dick |
| 4,715,484 A | 12/1987 | Flotow |
| 4,723,622 A | 2/1988 | Toshikuni et al. |
| 4,776,234 A | 10/1988 | Shea |
| 4,781,078 A | 11/1988 | Blessing et al. |
| 4,781,079 A | 11/1988 | Takahashi |
| 4,815,337 A | 3/1989 | Peloquin |
| 4,834,319 A | 5/1989 | Ewy et al. |
| 4,860,612 A | 8/1989 | Dick et al. |
| 4,863,004 A | 9/1989 | Kummer et al. |
| 4,876,920 A | 10/1989 | Eichenberger |
| 4,920,734 A | 5/1990 | Wenzel |
| 4,934,213 A | 6/1990 | Niizawa |
| 4,940,126 A | 7/1990 | Flotow et al. |
| 4,946,017 A | 8/1990 | Flotow |
| 4,959,043 A | 9/1990 | Klotz |
| 4,969,319 A | 11/1990 | Hutchison et al. |
| 5,055,095 A | 10/1991 | Osenbaugh et al. |
| 5,077,959 A | 1/1992 | Wenzel |
| 5,078,659 A | 1/1992 | von Kaler et al. |
| 5,080,640 A | 1/1992 | Botterill |
| 5,090,949 A | 2/1992 | Thoma et al. |
| 5,098,360 A | 3/1992 | Hirota |
| 5,116,159 A | 5/1992 | Kern, Jr. et al. |
| 5,127,215 A | 7/1992 | Wenzel |
| 5,149,309 A | 9/1992 | Guimbretiere |
| 5,161,636 A | 11/1992 | Haupt et al. |
| 5,183,446 A | 2/1993 | Hughes |
| 5,195,933 A | 3/1993 | Thoma et al. |
| 5,228,366 A | 7/1993 | Thoma et al. |
| 5,301,769 A | 4/1994 | Wiess |
| 5,314,387 A | 5/1994 | Hauser et al. |
| 5,505,267 A | 4/1996 | Orbach et al. |
| 5,507,138 A | 4/1996 | Wright et al. |
| 5,531,653 A * | 7/1996 | Barnbolt .................... 475/237 |
| 5,600,944 A | 2/1997 | Wright et al. |
| 5,611,746 A | 3/1997 | Shaffer |
| 5,613,409 A | 3/1997 | Hauser |
| 5,647,814 A | 7/1997 | Krisher |
| 5,718,653 A | 2/1998 | Showalter |
| 5,765,347 A | 6/1998 | Wright et al. |
| 5,782,717 A | 7/1998 | Smothers et al. |
| 5,807,200 A | 9/1998 | Hauser |
| 5,809,755 A | 9/1998 | Velke et al. |
| 5,863,271 A | 1/1999 | Schreier et al. |
| 5,897,452 A | 4/1999 | Schreier et al. |

DIFFERENTIAL AND METHOD FOR VARIABLE TRACTION CONTROL

FIELD OF THE INVENTION

This invention relates generally to differentials and more particularly, to differentials capable of controlled power transmission to multiple output shafts.

BACKGROUND OF THE INVENTION

The control of power output from a power source such as a drive shaft to more than one output (i.e., two wheels driven by respective output shafts) is a function accomplished in numerous ways in the prior art. A differential is typically used to transmit power to output shafts on opposing sides of the differential. For purposes of illustration only, the following discussion is with reference to a conventional differential having one input and two outputs in the form of co-axial output shafts driving respective wheels. However, it will be appreciated by one having ordinary skill in the art that the following discussion applies equally to other differential types having more outputs and having outputs which are different from shafts turning wheels.

In a conventional differential having two output shafts, rotational power is transmitted from a differential housing or ring gear to orbit one or more planet gears about a differential axis. The planet gears are engaged with side gears, each of which is connected to and turns an output shaft. When the planet gears orbit, they rotate the side gears to turn their respective output shafts. The planet gears normally do not rotate when the output shafts are equally loaded, and therefore the side gears rotate at the same speed. However, when the output shafts are loaded differently (e.g., when one wheel begins to spin faster than the other, when the traction of one wheel is significantly greater than the traction of the other, etc.), the planet gears rotate as they orbit, thereby turning the side gears at different speeds with respect to one another and driving the output shafts at different speeds. This speed differential can present problems in system performance, particularly when one output shaft spins with little or no load, thereby drawing power through the path of least resistance to that shaft.

Conventional differentials often employ limited slip devices to provide a minimum threshold torque resistance to each output shaft. When one wheel begins to slip and drain power supplied to the differential, a limited slip device on that shaft provides a minimum resistance. Power therefore continues to be transmitted to the opposite shaft rather than being drained to the shaft corresponding to the slipping wheel.

Most early differentials employ one or more elements which apply a constant force against the planet gears and/or the side gears to establish the above-mentioned minimum threshold torque resistance. These elements include pins which are threaded through the differential housing and which ride upon the rear surfaces of the gears, spring-loaded wedge blocks fitted between the planet gears and pressing with frictional engagement against the sides of the gears, and braking disks, disk packs, and/or Belleville springs pressed under spring force against one or more faces of the gears, etc. Although each of these elements function adequately to exert frictional force against the planet gears or side gears to inhibit spinning, they are either incapable of adjustment or must be adjusted manually after the equipment has been stopped. For example, the Belleville springs commonly used are often inaccessible without disassembling at least part of the differential, and have a spring force which is generally not adjustable. Also, the braking disks and disk packs are usually pressed by a conventional element (such as an adjustable threaded fastener or by an internal spring) which must be hand turned or adjusted as the disks or packs wear upon the gear surfaces. Such a differential design increases maintenance and operational costs of the differential, requires interruption of vehicle operation for adjustment, and results in a differential having braking effectiveness which varies as elements wear.

To address some of the drawbacks of older differentials, newer differential designs employ assemblies and devices for braking planet or side gears without manual adjustment and without the need to stop differential operation for adjustment. For example, U.S. Pat. No. 4,776,234 issued to Dennis W. Shea employs an energizing coil and magnet capable of adjusting pressure of a clutch pack against a side gear when the coil is energized. The electromagnetic control of this device enables a user to adjust the braking force of a desired gear through a range of frictional braking forces. As another example, U.S. Pat. No. 4,934,213 issued to Yoshikazu Niizawa uses oil pressure cylinders supplied by a controllable pressurized oil source to control pressure upon a frictional clutch having a number of frictional clutch plates between a differential housing and a side gear of the differential. By changing the oil pressure to the oil pressure cylinders, pressure upon the clutch plates can be changed to thereby change the frictional braking upon the side gear. Both the Shea and Niizawa devices represent improvements over the prior art in their ability to be adjusted without manually adjusting braking elements and without stopping the differential. But like other prior art devices capable of "on-the-fly" gear braking adjustment, these devices are relatively complex, particularly in comparison to their earlier counterparts. Such devices are expensive to manufacture, assemble, service, and repair. These problems are due at least in part to the design necessary for the anticipated applications of the differentials. The differentials must be able to operate on equipment such as cars, trucks, and off-road vehicles, and must therefore operate under demanding conditions of stress, power, and speed. However, these differentials are not well suited to less demanding applications in which the vehicles are not fast moving and are not exposed to heavy load conditions.

In light of the problems and limitations of the prior art described above, a need exists for a differential which is simple, easy and inexpensive to manufacture, assemble, service, and repair, well-adapted to low speed and normal loading conditions, capable of traction control adjustment (i.e., braking of planetary and/or side gears) without stopping the differential, and which is preferably infinitely adjustable over a differential braking range. Each preferred embodiment of the present invention achieves one or more of these results.

SUMMARY OF THE INVENTION

In each of the preferred embodiments of the present invention, an actuation element is movable during differential operation either directly or indirectly by a user to exert a braking force upon a side gear or a planet gear of the differential. The actuation element is most often a element accessible by a user, but in some embodiments is the side or planet gear itself. The braking force upon the side gear or the planet gear can be exerted directly upon a gear surface by a braking element or surface or upon an element (such as a pivot or an axle) to which the side gear or the planet gear is mounted. In either case, the amount of braking force applied is preferably controllable by controlled actuation of the actuation element through a range of positions. Therefore, a user can control the amount of braking force applied as desired or in response to different vehicle operating conditions (e.g. running upon and along a slope, operating in slippery or muddy conditions, and the like).

In a number of preferred embodiments, the actuation element is a lever, thrust rod, magnetic coil, or similar element which is movable or energized either to drive a brake element in harder or lighter frictional engagement with a planet or side gear or to drive a planet or side gear in harder or lighter frictional engagement with a brake element. In the first case, the actuation element can be a lever of a band brake which is tightenable around plant gear pivots, brake blocks in wedging relationship between planet gears, cone clutch elements fitted to planet or side gears in a cone clutch arrangement, or can be a lever, thrust rod, or similar element movable to push, pull, or otherwise move an element into frictional engagement with a surface of a side gear, or can be a magnetic coil that can be energized to move a brake element into frictional braking engagement with a gear or pivot. In the second case, the actuation element can be a lever, thrust rod, or similar element connected to an axle of the differential and capable of axially moving the axle (and the side gear mounted thereon) toward and away from a brake element. In other embodiments, the actuation element can be cables or other linking members which can be tightened or loosened to either directly actuate a brake element (such as by being directly connected to a band brake about a vehicle axle) or indirectly actuate a brake element via movement of a lever, thrust rod, or similar element as mentioned above. In still other embodiments of the present invention, actuation of the brake elements is inherently generated by operation of the differential. Specifically, wheel slip or speed differentiation between the axles generates outward loading and movement upon the planet and side gears to engage brake elements beside the planet and side gears.

The brake element actuated by the actuator can also take a number of forms. For example, the brake element can be one or more brake pads which are located between the inside of a differential housing and the side or planet gears. When the side or planet gears are translated axially away from the center of the differential (such as by the outward loading and movement generated by wheel slip or axle speed differentiation described above, or by an actuation element forcing the side or planet gears toward the differential housing) the brake pads become sandwiched between a surface of the side or planet gears and the differential housing and become frictionally engaged to slow or even prevent gear rotation. In another embodiment of the present invention, the brake element can be a wedge-shaped brake block located between two planet gears. When an actuation element such as a band brake or a brake element located beside the orbit path of the brake block (and planet gears) is moved to press the brake block in an inward direction, the brake block wedges against the planet gears or their respective pivots to slow or stop their rotation. The brake elements can instead be cone clutch elements mating with the planet or side gears. Such brake elements can be forced through a range of contact with the planet gears in the same or similar way as the wedge-shaped brake blocks, or with the side gears by being cammed or threaded into engagement with the side gears. In still other preferred embodiments of the present invention, the brake element can be a band brake fitted around an axle extending from the differential, a surface or portion of an element thrust into abutting relationship with a face of the gear by the actuation element, or a friction element against which the gears are pressed when moved by the actuation element.

The embodiments of the present invention disclosed herein present viable solutions to traction control problems because they are directed to applications in inherently slow-moving vehicles. While these embodiments are generally not applicable to higher-speed applications (such as automotive or truck applications), their designs employ a minimal number of parts which are easily manufactured, assembled, and serviced and therefore create a significant advantage over much more complex and expensive prior art devices for low speed vehicles. As mentioned above, each of the brake and actuation element combinations preferably permit a range of braking forces to be exerted upon the planet or side gears through a range of actuation positions while the differential is operating. This adjustment flexibility not only provides a user with improved and "on-the-fly" traction control, but also with much greater and more convenient control over the way in which the differential responds to slip in various operating conditions.

As discussed above, controlled traction differential devices exist for exerting braking force against one or more gears of a differential in a number of different ways. However, in addition to the advantages described above, each embodiment of the present invention offers a degree of traction control which is unavailable in much more complex and expensive prior art devices. In prior art differential traction control devices, not only is a user unable to quickly adjust gear braking according to a particular vehicle operation or environment encountered, but a user typically cannot make adjustments through a wide range—even down to no gear braking and up to full gear lock. For example, in a riding lawn mower application where the riding lawn mower is driven relatively slowly and tightly in a circle (such as where a user is cutting grass around the base of a tree), the speed differentiation of the axles extending from the differential is high. However, it is not desirable in such a case to brake the differential gears. Conventional traction control differential devices are unable to distinguish between cases such as this where traction control is not desired and those vehicle operations or environments in which traction control and gear braking is desired. Therefore, gear braking either occurs too often (e.g., constant gear braking even when no speed differentiation exists between the axles) or not often enough, or is restricted to certain operational speeds or speed differences between axles. Such constraints define limitations of prior art traction control devices, and have invited partial solutions which invariably add significant complexity and cost to differentials.

In contrast, highly preferred embodiments of the present invention provide a user with a very large amount of control over differential traction control operation—both in the amount of gear braking exerted and in the vehicle operations and environments in which gear braking is performed. In contrast with operation of conventional traction control differentials, a user of the present invention can preferably select from an infinite range of gear braking forces, including no gear braking and braking causing full gear lock. Also, the user preferably has full control to vary the amount of braking forces exerted at any given time, in any given application or operating condition, and at any given differential operating speed or axle speed difference. Differential frictional losses are therefore low and system efficiency is relatively high. In addition (and in large part owing to the relatively slow differential applications to which the present invention is directed), the present invention offers the above-described control without employing complex or expensive assemblies or devices.

Further objects and advantages of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts:

FIG. 7c is a perspective view of the cone clutch element shown in FIG. 7a;

FIG. 11b is a partial cross sectional view of the differential illustrated in FIG. 11a, showing an alternative actuator arrangement to that shown in FIG. 11a;

FIG. 13b is a partial cross sectional view of the differential illustrated in FIG. 13a, showing an alternative cone clutch element arrangement to that shown in FIG. 13a;

DETAILED DESCRIPTION OF THE PREFERRED EMBODIMENTS

Figure 1:
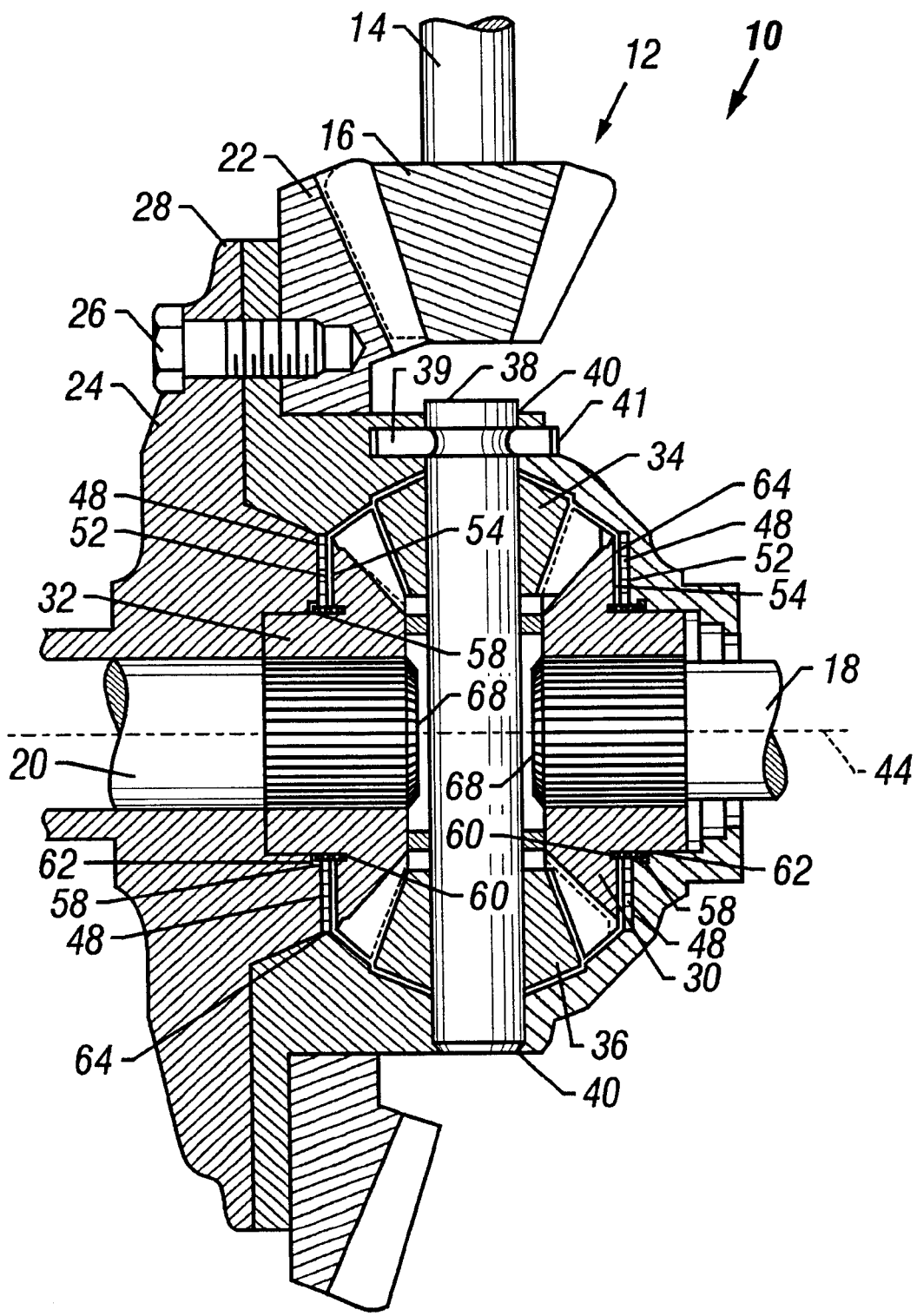
FIG. 1 is a cross sectional view of a differential according to a first preferred embodiment of the present invention.

Each preferred embodiment of the present invention has a number of features and elements which are common to many differentials of the prior art and which are now described to enable a better understanding of the present invention. With reference first to FIG. 1, the differential of the present invention is indicated generally at 10, and is rotatably driven by power from a drive train 12 (such as a drive shaft 14 connected in a conventional manner to a drive shaft pinion 16) to rotate vehicle axles 18 and 20. Specifically, the differential 10 preferably has a ring gear 22 powered by the drive train 12 in a manner well-known to those skilled in the art, such as by the pinion 16 meshing with the bevel ring gear 22 in FIG. 1. One having ordinary skill in the art will appreciate that other well-known elements and assemblies can be used to transmit power from the rotating drive train 12 to the differential 10. Though these alternative driving elements and assemblies are not common, the present invention finds application regardless of the manner in which the differential 10 is rotated by the drive train 12.

The ring gear 22 can be integral to or attached to a differential housing 24 by conventional fasteners, welding, press fitting, and the like. Preferably however, the ring gear 22 is attached to the housing 24 by a number of bolts 26 passed through apertures in one or more flanges 28 of the housing 24 and into matching threaded apertures in the ring gear 22 as shown in FIG. 1. Most preferably, the housing 24 is made of two portions which are fastened together by the bolts 26 and are sealed from leakage in a well known manner such as by a gasket (not shown) between the housing portions, a liquid sealant applied to one or both housing portions prior to their connection, a labyrinth seal defining the interface between the housing portions, and the like. Each of the two housing portions preferably extends to and around a respective axle 18, 20.

Within the differential housing 24 is a pair of side gears 30, 32 and at least one (and preferably at least two) planet gears 34, 36. As is well known in the art, the planet gears 34, 36 are mounted for rotation to the housing 24 about pivot 38 in a conventional manner. Preferably, the pivot 38 is received through aligned apertures 40 in the housing 24 and extends from one end of the housing 24 to the opposite end thereof. The pivot 38 is secured against rotation in the aligned apertures 40 in any conventional manner, including without limitation by welds, conventional fasteners, an interference fit, press fitting, a threaded, splined or keyed connection, and the like. To ensure that the planet gears 34, 36 are able to rotate about the pivot 38, a clearance fit exists between the planet gears 34, 36 and the pivot 38.

As an alternative to a pivot extending from one end of the housing 24 to another, separate pivots can be employed for each of the planet gears 34, 36 as is well known in the art. The separate pivots can be secured against rotation in the same manner as the single pivot 38 described above, with a clearance fit preferably existing between the planet gears 34, 36 and their respective pivots to permit planet gear rotation. However, it should be noted that where separate pivots are employed, each planet gear 34, 36 can be fixed to its pivot for rotation therewith, in which case the pivots are rotatable in the housing apertures 40 and the planet gears are fixed upon their respective pivots in a conventional manner (e.g., via welds, conventional fasteners, an interference fit, press fitting, a threaded, splined, or keyed connection, an integral planetary gear and pivot element, and the like).

To limit axial movement of the pivot 38, the ends of the pivot 38 can be flanged, knurled, or capped, or have a element attached thereto which is wider than the apertures 40, or the apertures 40 can be plugged after installation of the pivot 38. Alternatively, and as shown in FIG. 1, an end of the pivot 38 can have a circumferential groove 39 within which rides a cross pin (not shown) inserted into holes 41 in the housing 24 at right angles to the pivot 38.

The planet gears 34, 36 mesh with the side gears 30, 32 in a manner well known to those skilled in the art. The side gears 30, 32 are preferably secured to their respective axles 18, 20 for rotation therewith, and can be secured in any of the manners described above with reference to the planet gears 34, 36 secured to respective separate pivots. Most preferably however, the axles 18, 20 are connected to their respective side gears 30, 32 through conventional spline connections as shown in FIG. 1. The spline connections can be a clearance fit to permit axial movement of the axles 18, 20 with respect to the side gears 30, 32 (limited, however, in a conventional manner by shoulders on the ends of the axles and/or on the axle outside of the differential housing 24, by caps upon the ends of the axles 18, 20, by cross pins inserted through holes in the axles 18, 20 on either side of the side gears 30, 32, and the like, not shown). Alternatively, the side gears 30, 32 can be secured against axial movement with respect to their respective axles 18, 20. In such case, each axle and side gear unit can be prevented from axial movement or have axial movement limited in a conventional manner by one or more shoulders on each axle 18, 20 and/or on each side gear 30, 32, by engagement of gear surfaces with the differential housing 24 and with the planet gears 34, 36, etc.

As is well known in the art, power is supplied from the rotating drive train 12 (and preferably from the rotating pinion 16 thereon) to the ring gear 22 to rotate the ring gear 22 and the housing 24 about an axis 44 common to both of the axles 18, 20. The pivot 38 attached to the housing 24 therefore also rotate about the axis 44 and the planet gears 36 upon the pivot 38 orbit about the axis 44. When both axles 18, 20 rotate at the same speed, such as when both vehicle wheels attached to the axles 18, 20 are traveling in a straight and parallel manner, power is transmitted from the rotating differential housing 24 to the planet gears 34, 36 which orbit about the axis 44 without rotating about the pivot 38. Both side gears 30, 32 are therefore rotated at the same speed to turn the wheels at the same speed.

However, if one wheel loses traction and slips or otherwise turns faster than the other wheel, power transmitted to the rotating pivot 38 follows the path of least resistance, in which case the planet gears 34, 36 are caused to rotate about the pivot 38. Such rotation creates a difference in the relative speeds of the side gears 30, 32 which if left unchecked permits power to be drained to the slipping wheel (e.g., much or all of the power into the differential being transmitted to the side gear and axle of the slipping wheel). Conventional differentials employ one or more elements or devices which interfere with the differential's ability to drain power to a slipping wheel in this manner. Specifically, by interfering with the ability of the planet gear to rotate about the pivot 38 and/or by interfering with the ability of a side gear 30, 32 to spin under a threshold torque, greater resistance is provided against power drainage to the slipping wheel and therefore more power is transmitted to the non-slipping wheel. However, most conventional differentials either do not permit adjustment of such elements or devices creating the interference or permit adjustment only when the differential is not operating. Adjustability of these elements and devices permits a user to change the threshold torque above which the elements and devices permit the planet gears 34, 36 and/or the side gears 30, 32 to rotate.

"On-the-fly" user adjustability through a range from substantially full interference (preventing such rotation) to substantially no interference is most preferable and is accomplished by the following described embodiments of the present invention. In each embodiment, an actuation element taking a number of possible forms (such as an axially movable gear, a lever, a cam element, a thrust rod, an actuator with pivotable brake elements, a band brake, a cable, a magnetic coil, and the like) is actuatable by a user either directly or indirectly to frictionally engage a planet gear or a side gear of the differential. The frictional engagement can be performed by a number of different brake elements (such as brake pads, brake blocks, tapered friction plugs, cone clutch elements, a band brake, a brake ring and the like) and in a number of different manners (such as by frictionally engaging the planet gear pivots, the vehicle axles, the side or planet gears directly, etc.). Also, each embodiment described preferably permits a user to manually or automatically actuate the actuation element through a range of positions corresponding to a range of braking forces exerted by the brake elements upon the planet or side gears. In this connection, it should be noted that when a braking force is described herein and in the appended claims as being exerted upon a planet gear or a side gear, such a braking force can refer to braking forces applied either directly to the subject gear or indirectly to the subject gear via a connected element such as by braking a pivot or an axle to which the gear is mounted. For example, a side gear is "braked" or a braking force is "applied to a side gear" when the braking is performed on the axle to which the side gear is mounted. By braking the axle, the user effects braking of the side gear mounted thereon.

In the first preferred embodiment of the present invention shown in FIG. 1, brake pads 48 are preferably attached to the interior walls 52 of the differential housing 24 in a conventional manner, such as by threaded fasteners, riveting, welding, brazing, gluing, and the like. As is known in the art, the reaction of meshing gears to their rotation is a force or forces pushing the gears away from one another. As the meshing speed of gears increases, so do the forces pushing the meshing gears (e.g., the planet gears 34, 36 meshing with the side gears 30, 32) away from one another. As a reaction to these forces, the side gears 30, 32 approach the interior walls 52 of the housing. When the speed differential between the side gears 30, 32 becomes sufficiently large, such as when one wheel begins to slip and spin, the forces pushing the side gears 30, 32 as described cause the rear faces 54 of the side gears 30, 32 to come into contact with the brake pads 48 on the interior walls 52 of the differential housing 24. This contact creates a braking force upon the side gear corresponding to the slipping wheel, raising the torque necessary to turn the slipping wheel and thereby transferring torque to the opposite wheel.

An important aspect of the present invention according to the above-described embodiment is the self-adjustability of the rotational resistance exerted upon the side gears 30, 32. Specifically, as the speed differentiation between the planet gears 34, 36 and the side gears 30, 32 increases (e.g., as a result of increased wheel slippage), the forces pushing the side gears 30, 32 away from the planet gears 34, 36 and against the brake pads 48 increase to exert a larger braking force upon the slipping wheel and to transfer more power to the non-slipping wheel. The magnitude of the side gear braking force and torque transfer directly corresponds to the amount of wheel slippage and spin. A decrease in traction therefore automatically results in an increase in side gear braking and an increase in torque transfer commensurate with the amount of traction loss.

The amount of outward force upon the side gears 30, 32 exerted by their rotation with respect to the meshing planet gears 34, 36 is dependent upon the tooth profiles of each gear. As is evident from the above discussion, the tooth profiles of the planet gears 34, 36 and the side gears 30, 32 are selected to exert increasing force as a function of increased side gear 30, 32 rotation (resulting from wheel traction loss). In other words, the teeth of the planet gears 34, 36 and the teeth of the side gears 30, 32 are selected so that the outward force upon the side gears 30, 32 at each speed difference between the planet gears 34, 36 and the side gears 30, 32 is large enough to exert sufficient braking force as described above but is small enough not to overbrake the side gears 30, 32 against the brake pads 48. The particular tooth profile of each gear set operating in this manner varies considerably from differential to differential, and is dependent at least partly upon the thickness of the gears and the relative sizes of the gears 30, 32, 34, 36 in the differential. As a result of the above-described gearing, a range of forces is produced that provides sufficient braking at each speed difference between the planet gears 34, 36 and the side gears 30, 32 to provide torque transfer from a slipping wheel to a non-slipping wheel. Other braking force ranges are possible based upon different tooth profiles for the planet gears 34, 36 and the side gears 30, 32.

Rather than being attached in a conventional manner to the interior walls 52 of the differential housing 24, the brake pads 48 can instead be attached in any of the above-mentioned manners to the rear faces 54 of the side gears 30, 32 to perform the same braking functions described above. In another alternative embodiment, brake pads 48 are attached to both the rear faces 54 of the side gears 30, 32 and the interior walls 52 of the differential housing 24. The freedom to attach the brake pads 48 in such different locations is due at least in part to the relatively low gear speeds of the applications in which the present invention is used.

Although not required to practice the present invention, it is desirable in certain applications for there to be little or no braking force exerted by the brake pads 48 when there is no speed difference between the axles 18, 20 (when no torque transfer due to wheel slipping is called for). Alternatively, it may be desirable to limit the maximum braking which can be exerted by the brake pads 48 under high-slip conditions. In either case, a spring 58 can be used to limit the movement of the side gears 30, 32 toward the interior walls 52 of the differential housing 24 and therefore to limit the force exerted against the brake pads 48 to brake the side gears 30, 32. In the preferred embodiment of the present invention shown in FIG. 1, coil compression springs 58 are placed around a body portion of each side gear 30, 32 and are sandwiched between facing shoulders 60, 62 of the side gears 30, 32 and the interior walls 52 of the differential housing 24, respectively. When no speed differential exists between the axles 18, 20 during operation of the differential, relatively small outward forces exist upon the side gears 30, 32. Such forces are insufficient to compress the spring 58 and to close a gap 64 which normally exists between the side gears 30, 32 and the brake pads 48 on the interior walls 52 of the differential housing 24. However, when such a speed differential exists and the planet gears 34, 36 rotate with respect to the side gears 30, 32, the outward force generated against the side gears 30, 32 grows with increasing side gear speed difference until the spring 58 is compressed and the brake pads 48 touch and begin rubbing against and braking the side gears 30, 32. Still greater side gear speed differences create increased spring compression and increased braking proportional to the magnitude of the difference (i.e., the amount of wheel slip and traction loss). As the side gear speed difference lessens and traction is regained, the springs 58 push the side gears 30, 32 away from the brake pads 48 until there is no speed difference and the gap 64 exists again between the side gears 30, 32 and the brake pads 48.

It will be appreciated by one having ordinary skill in the art that the springs 58 employed in the preferred embodiment described above can be replaced by a number of other spring types performing the same function. For example, the springs 58 need not encircle the side gear body and the axle 18, 20 as shown in the figures. One or more springs can instead be attached to the interior walls 52 of the differential housing 24 or to the side gear rear faces 54 about the periphery of the axle 18, 20. These springs can take a number of forms, including without limitation coil springs, leaf springs, Belleville springs, and the like. The springs can instead be extension, leaf, spiral, or other springs rotatably connected in a conventional manner between the interior faces 66, 68 of the axles 18, 20 (e.g., connected between conventional bearings, pivots, ball joints, and the like on the facing ends of the axles 18, 20) to bias the axles 18, 20 toward one another. In such case, because the internal chamber 42 should be open enough to house the spring(s), dedicated pivots for each planet gear 34, 36 are preferably used rather than one pivot 38 extending across the internal chamber 42 as shown in FIG. 1.

As mentioned above, springs 58 can be employed to limit the maximum braking of the present invention. Using any of the spring types and placements described above, springs can be selected to exert an increasing force against further spread of the side gears 30, 32 up to a point at which the spring permits no additional spread and braking. Springs having such force ramping properties are well known to those skilled in the art and are therefore not described further herein.

Although gaps 64 are preferred between the interior walls 52 of the differential housing 24 and the rear faces 54 of the side gears 30, 32 when no or a relatively small speed differentiation exists between the axles 18, 20 as described above, these gaps are not required to practice the present invention. Specifically, the side gears 30, 32 can continually ride against the brake pads 48 under a relatively light compression force when no axle speed differential exists, and can exert an increased outward force upon the brake pads 48 proportional to the axle speed differential with increased speed differentiation between the axles 18, 20.

Figure 2:
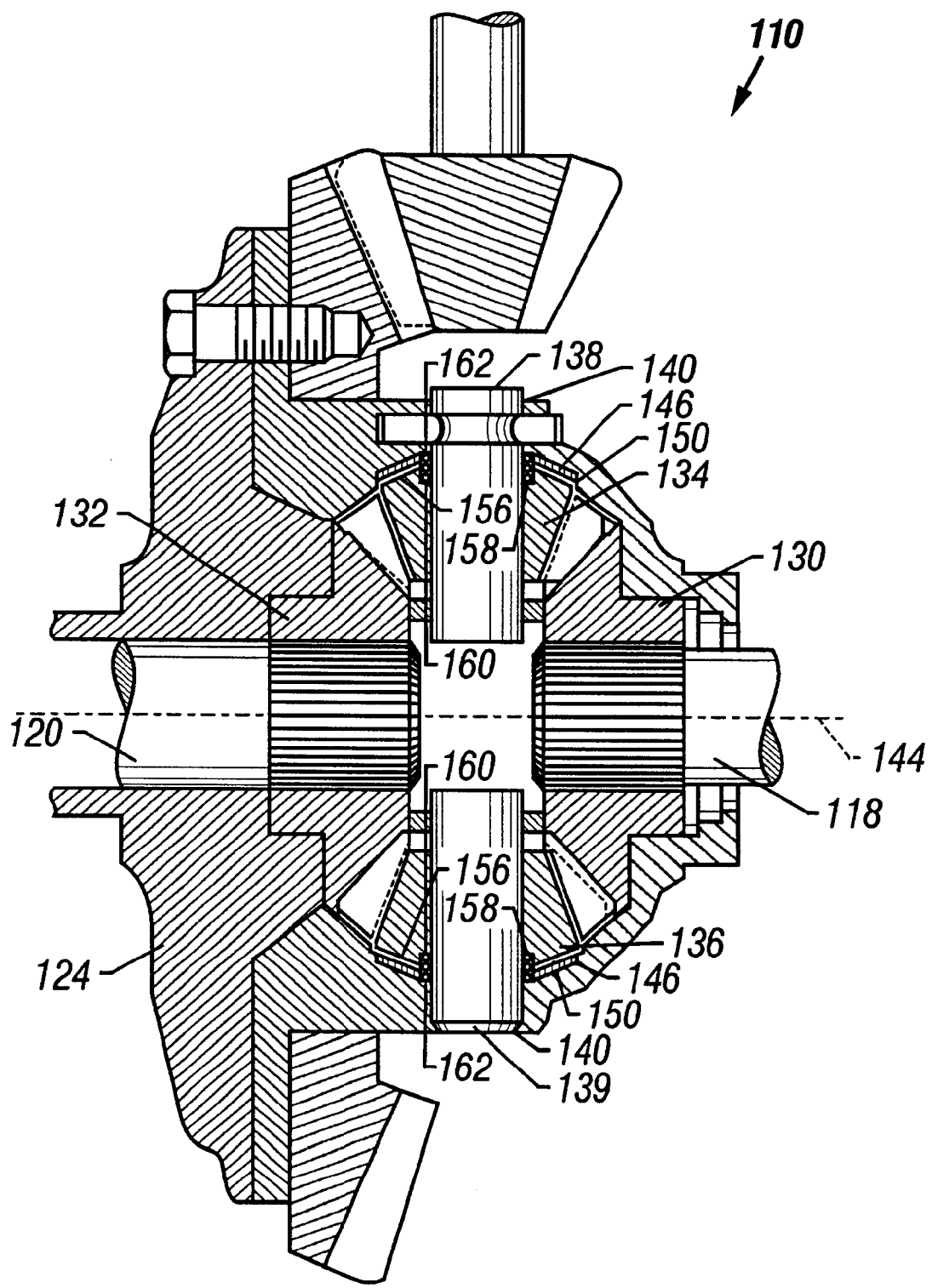
FIG. 2 is a cross sectional view of a differential according to a second preferred embodiment of the present invention.

A second preferred embodiment of the present invention is illustrated in FIG. 2. In this embodiment, brake pads 146 are located between the planet gears 134, 136 and the interior walls 150 of the differential housing 124. The brake pads 146 operate in much the same manner as the brake pads 48 of the first preferred embodiment. To permit axial movement of the planet gears 134, 136 for the braking process, the spanning pivot design of the first preferred embodiment is replaced by dedicated pivots for each of the planet gears 134, 136. It should be noted, however, that the same pivot design of the first preferred embodiment can still be used if the planet gears 134, 136 are not secured for rotation with the pivot. Specifically, the pivot in the single-pivot design would be fixed against rotation, with the planet gears 134, 136 rotatable about the pivot and capable of limited axial movement along the pivot for braking in the same manner as described above.

In the second preferred embodiment however, the dedicated pivots 138, 139 connected to the planet gears 134, 136, respectively, rotate within the housing apertures 140 in a conventional manner. The brake pads 146 are preferably attached in a conventional manner to the interior walls 150 of the differential housing and/or to the rear faces 156 of the planet gears 134, 136 as in the first preferred embodiment. In a no-slip wheel condition (where there is no speed difference between the axles 118, 120), the planet gears 134, 136 remain substantially in their positions shown in FIG. 2 as they orbit about the differential axis 144. However, when wheel slippage occurs and as the planet gears 134, 136 react by rotating and meshing with the side gears 130, 132, the resulting outward force upon the planet gears 134, 136 increases sufficiently to cause the planet gears 134, 136 to move toward the interior walls 150 of the differential housing 124 and to engage the brake pads 146. The amount of outward force generated is proportional to the amount of planet gear rotation and wheel slippage. Therefore, the amount of braking generated by the outward force is proportional to the amount of wheel slippage as in the first preferred embodiment.

Also as in the first preferred embodiment, gaps can exist between the planet gears 134, 136 and the interior walls 150 of the differential housing 124 when there is no or little speed differential between the axles 118, 120. However, such gaps are not necessary for the planet gears 134, 136 because the planet gears 134, 136 do not rotate unless a speed differential exists between the axles 118, 120 (under the same conditions in which gear braking is desirable). Therefore, the planet gears 134, 136 upon their respective pivots 138, 139 are preferably located in the differential lightly contacting the interior walls 150 of the differential housing 124. Increased outward gear movement caused by rotation of the planet gears 134, 136 from different axle speeds therefore causes increased braking forces. The braking forces increase as the axle speed difference increases.

Like the springs 58 used in the first preferred embodiment of the present invention, springs 158 can be employed to control the outward movement of the planet gears 134, 136 caused by their rotation and meshing with the side gears 130, 132. These springs 158 can be in the form of coil springs around the pivots 138, 139 and sandwiched between shoulders 160, 162 of the planet gears 134, 136 and the interior walls 152 of the differential housing 124, respectively as shown in FIG. 2. The springs 158 can instead take any of the alternative forms and be located in alternative positions such as those described above with respect to the first preferred embodiment (e.g., extension springs between the pivots 138, 139, Belleville, coil, or leaf springs, and the like).

It should be noted that the first and second embodiments of the present invention described above are well suited to applications in which differential operating speeds are relatively low, such as for tractors, riding lawnmowers, and other relatively slow-moving equipment. Specifically, the above two embodiments rely in part upon the inherent motion of meshing gears to push away from one another when they are turned with respect to one another. This motion necessarily changes the meshing relationship between the gears and therefore presents unacceptable loading upon the gears at high speeds and especially at high speeds and high loads. However, the changed meshing relationship does not present problems at relatively low speeds such as planet and side gear speeds under 200-300 RPM - typical operating speeds for relatively slow moving vehicles. The second embodiment of the present invention is also best-suited for slower vehicles due to the forces exerted upon the planet gears 134, 136 at high differential speeds. At such speeds, centrifugal force combines with the inherent outward gear motion described above to increase the braking force upon the planet gears 134, 136. Although this can be compensated for by preloading the planet gears 134, 136 and/or the pivots 138, 139 under spring force as also described above, such preloading is not preferred for optimal braking responsiveness at slower differential speeds in which less centrifugal force exists. Therefore, the first and second embodiments of the present application are best suited for low speed non-automotive applications.

Another manner in which braking can be performed upon differential planet gears is by generating frictional interference upon the planet gear pivot(s) and/or upon the planet gears themselves by actuation of one or more braking members external to the differential housing. Two such embodiments are illustrated in FIGS. 3–4 and 5–6.

Figure 3:
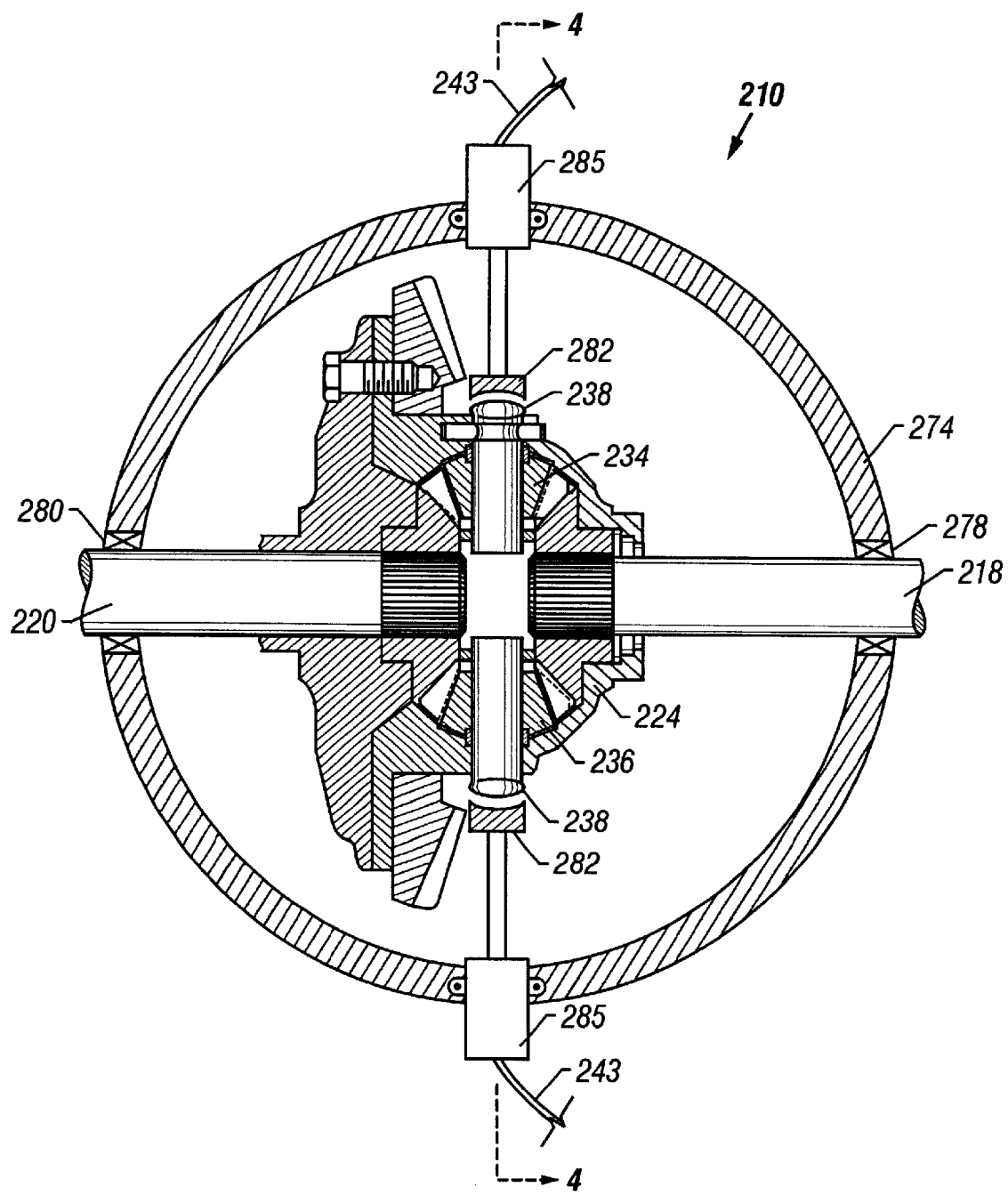
FIG. 3 is a cross sectional view of a differential according to a third preferred embodiment of the present invention.
Figure 4:
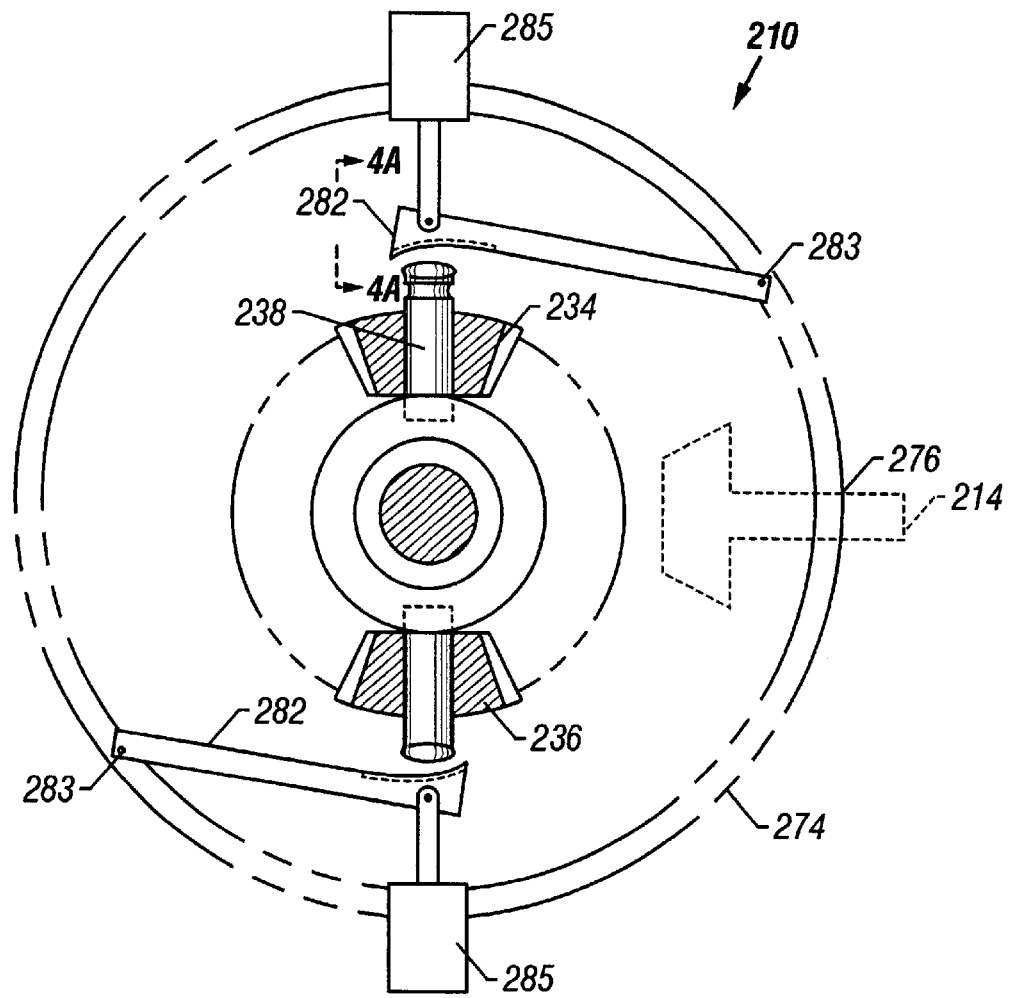
FIG. 4 is a cross sectional view of the differential illustrated in FIG. 3, taken along lines 4—4 in FIG. 3.

With reference first to the third preferred embodiment of the present invention illustrated in FIGS. 3 and 4, separate pivots 238, 239 are attached to the planet gears 234, 236 for rotation therewith and extend outside of the differential housing 224. An outer differential case 274 is also visible in FIGS. 3 and 4, and preferably has apertures 276, 278, 280 through which extend the drive shaft 214 and the two axles 218, 220, respectively. The apertures 276, 278, 280 are preferably sealed from leakage and support the drive shaft 214 and the two axles 218, 220 in a manner well known to those skilled in the art.

The differential 210 has at least one brake shoe 282 attached to the inside of the outer differential case 274 and aligned with the orbit path of the pivots 238, 239 as shown in FIGS. 3 and 4. Preferably, multiple brake shoes 282 are located in a spaced arrangement around the circumference of the differential housing 224, and are each aligned with the orbit path of the pivots 238, 239. Each brake shoe 282 is movable from a position in which the brake shoe 282 is located a distance from the pivots 238, 239 as they orbit about the differential axis 244 as shown in FIGS. 3 and 4 to a position in which the brake shoe 282 contacts the outer ends of the pivots 238, 239 as they orbit. This movement can be accomplished in a variety of ways, such as by pivoting the brake shoes 282 upon pivots 283 secured to the internal walls of the outer differential case 274 as best seen in FIG. 4, by turning radially-directed threaded rods (to which the brake shoes 282 are attached) into and out of threaded holes in the outer differential case 274, by actuating electronic or hydraulic actuators to push and pull the brake shoes 282 toward and away from the pivots 238, 239, by attaching electrically or thermally-responsive wires ("muscle wires") between the brake shoes 282 and the outer differential case 274 (such wires being responsive to electrical current passed therethrough by changing shape and thereby exerting force), and the like. Most preferably, each brake shoe 282 is attached to a respective electrical actuator 285 mounted to the inside of the outer differential case 274 in a conventional manner. Electrical leads 243 preferably run from the actuators 285 to a controller which can be operated automatically or manually to simultaneously engage the actuators 285 when a difference in speed is detected between the axles 218, 220. Such actuators 285 and their manner of connection are well known to those skilled in the art and are therefore not described further herein. However, it should be noted that the actuators 285 can be any type (i.e., electrical, pneumatic, hydraulic, and the like) capable of pushing and pulling the brake shoes 282 relative to the exposed ends of the pivots 238, 239.

The various actuation mechanisms described are each preferably controllable to locate the brake shoes 282 in a range of positions with respect to the pivots 238, 239. As the actuation mechanism pushes the brake shoes 282 closer to the exposed ends of the pivots 238, 239, frictional engagement with the pivots 238, 239 increases. Therefore, the amount of braking generated by actuation of the actuators 285 (or other actuation member types) can be controlled in a conventional manner by a user during differential operation to exert a range of braking forces upon the differential responsive to the amount of wheel slip experienced. Actuators whose positions can be user controlled through a range of actuation positions are well known to those skilled in the art and are therefore not discussed further herein.

Figure 4A:
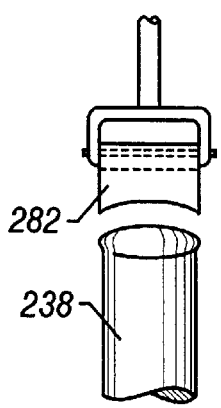
FIG. 4a is a detail view of the differential shown in FIGS. 3 and 4, showing a pivot end being braked by a brake shoe.

To improve braking operations of the actuators 285 and the brake shoes 282 upon the pivots 238, 239, the exposed ends of the pivots 238, 239 are preferably enlarged as shown in FIGS. 3 and 4. The widened ends of the pivots 238, 239 provide increased pivot surface area against which the brake shoes 282 can ride to brake the rotating pivots 238, 239 and planet gears 234, 236. Although wide rounded pivot ends are shown in FIGS. 3 and 4, any pivot end shape in which an enlarged amount of pivot end surface area is exposed to the brake shoes 282 can instead be used. The wide rounded pivot ends of the differential shown in FIGS. 3 and 4 are preferred because they provide an increased surface area for frictional contact with the brake shoes 282 upon actuation of the brake shoes 282 into engagement with the pivot ends. To also increase frictional engagement during braking, the pivot ends are preferably frictionally engaged with the actuated brake shoes 282 along as much of the orbit path of the pivot ends as possible (thus explaining the elongated shape of the brake shoes shown in FIG. 4). Also, the shape of the brake shoe surface facing the orbiting pivot ends is preferably matched to the shape of the pivot ends. As best seen in FIG. 4a (a cross sectional view of a brake shoe 282 of FIG. 4 in frictional engagement with an end of a pivot 238 during braking), the preferred wide rounded ends of the pivots 238, 239 frictionally engage a concave facing surface of the brake shoes 282 during braking. One having ordinary skill in the art will appreciate that many different brake shoe cross sectional shapes can be used to match different pivot end shapes, including without limitation a V-shaped concave brake shoe braking surface for braking enlarged pointed or cone-shaped pivot ends, a stepped brake shoe braking surface or a longitudinal groove in the braking surface of the brake shoes 282 within which is received post or stud-shaped pivot ends, and the like. Each such alternative brake shoe and pivot end shape preferably provides a relatively large amount of frictionally engaging surface area between the ends of the pivots 238, 239 and the braking surface of the brake shoes 282.

Figure 5:
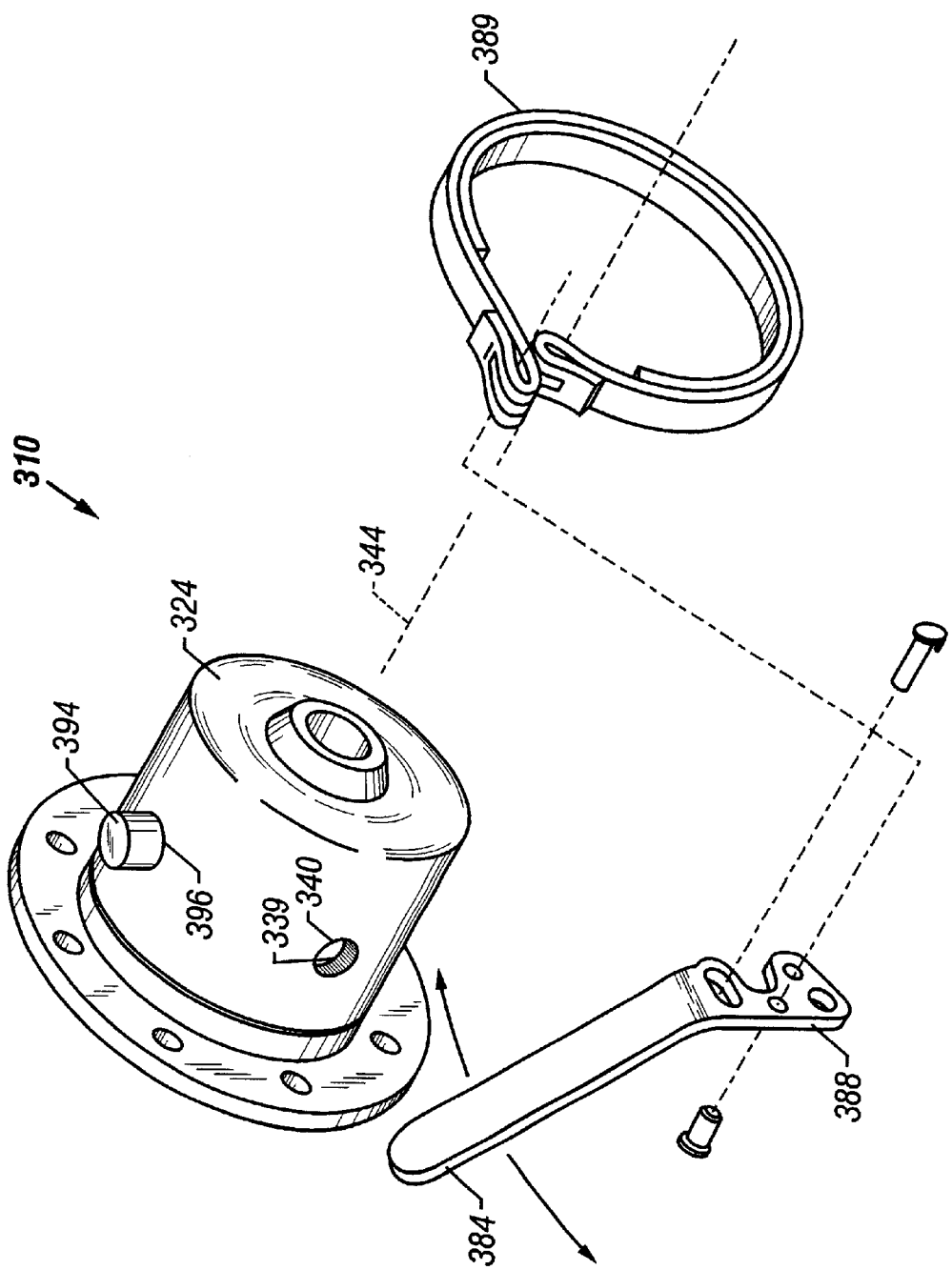
FIG. 5 is a perspective view of a differential according to a fourth preferred embodiment of the present invention.
Figure 5A:
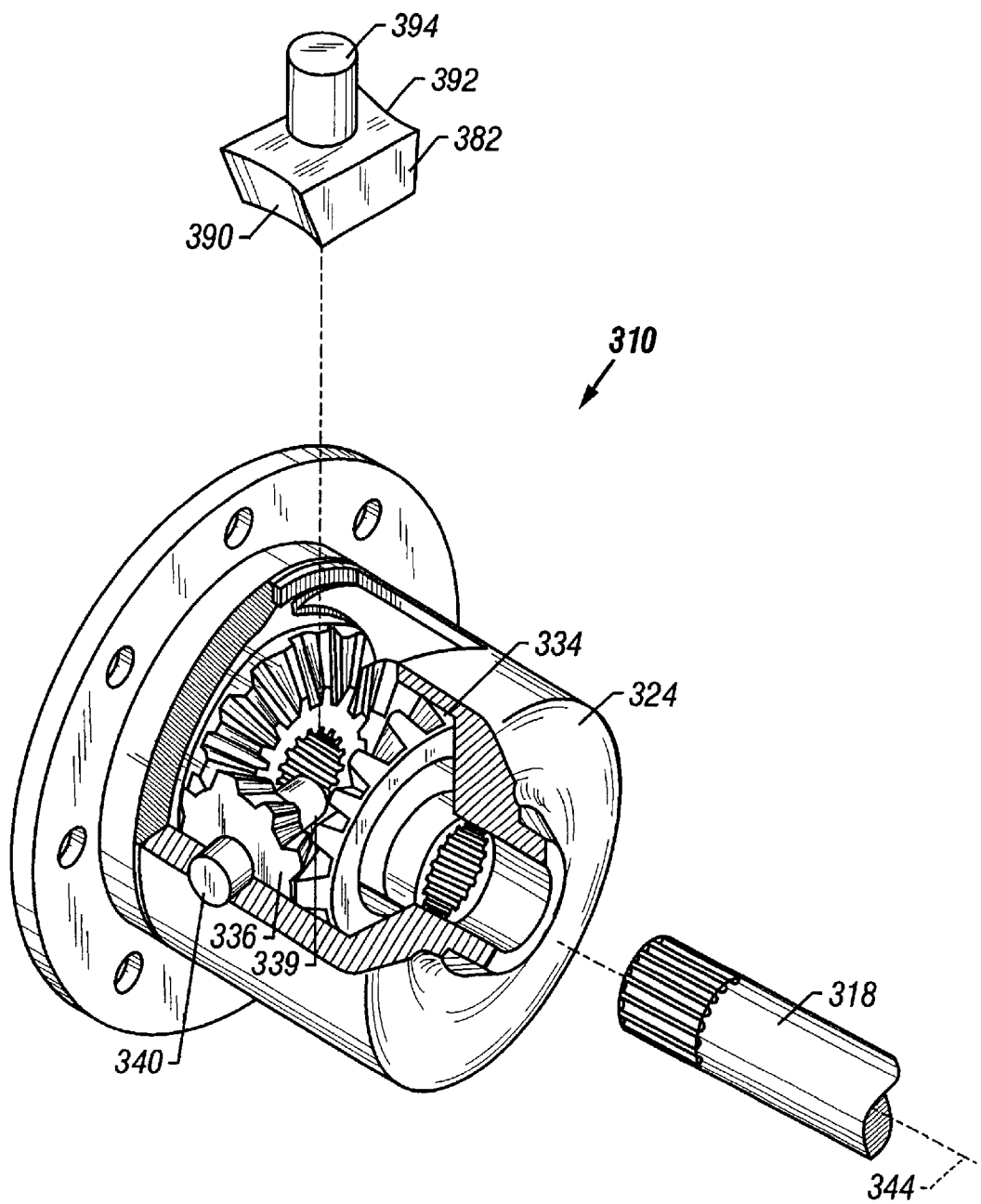
FIG. 5a is a perspective view, partly broken away, of the differential illustrated in FIG. 5, showing the band brake and differential housing removed and showing a first brake block type used in the differential.
Figure 5B:
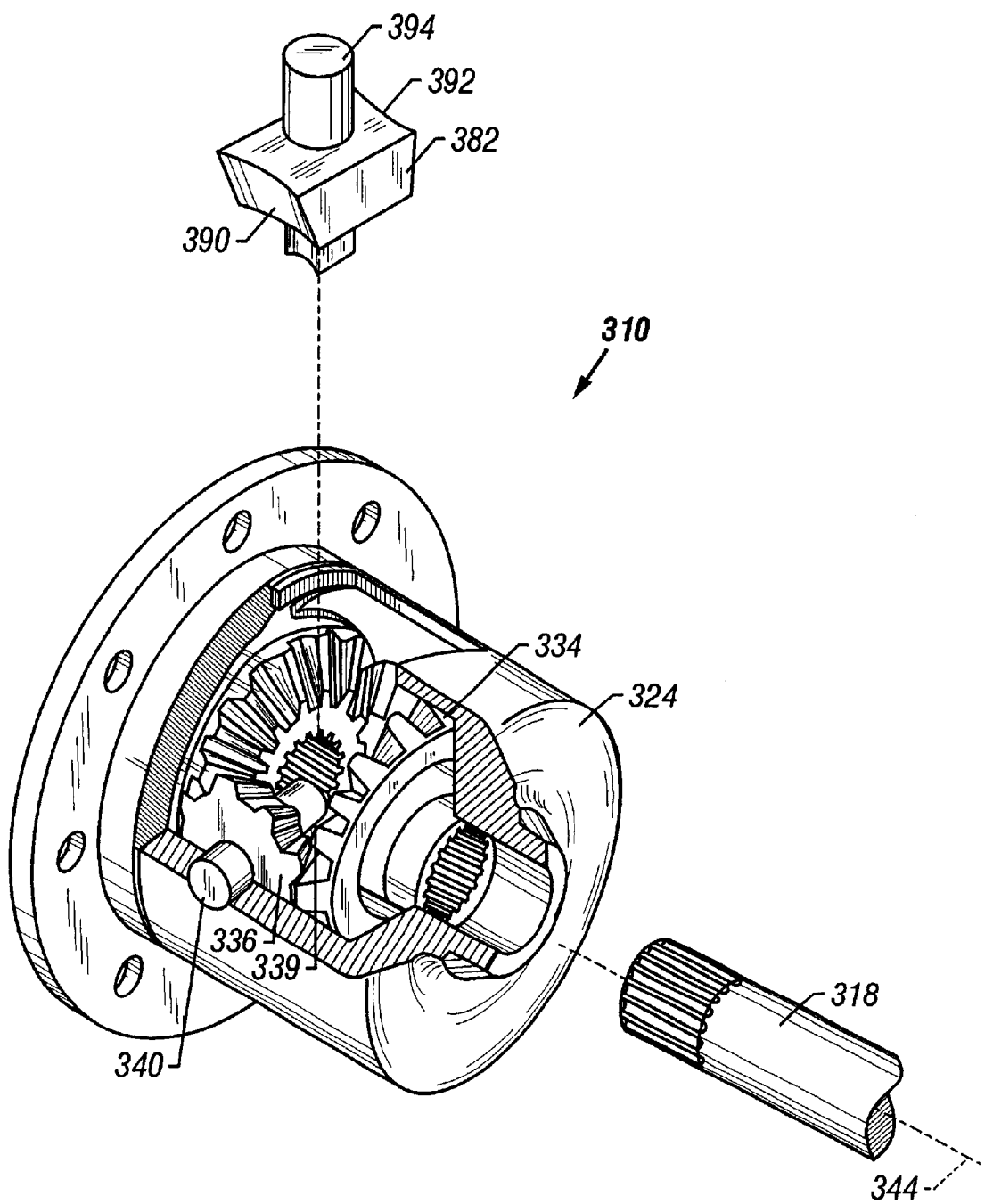
FIG. 5b is a perspective view, partly broken away, of the differential illustrated in FIG. 5, showing the band brake and differential housing removed and showing a second brake block type used in the differential.
Figure 6:
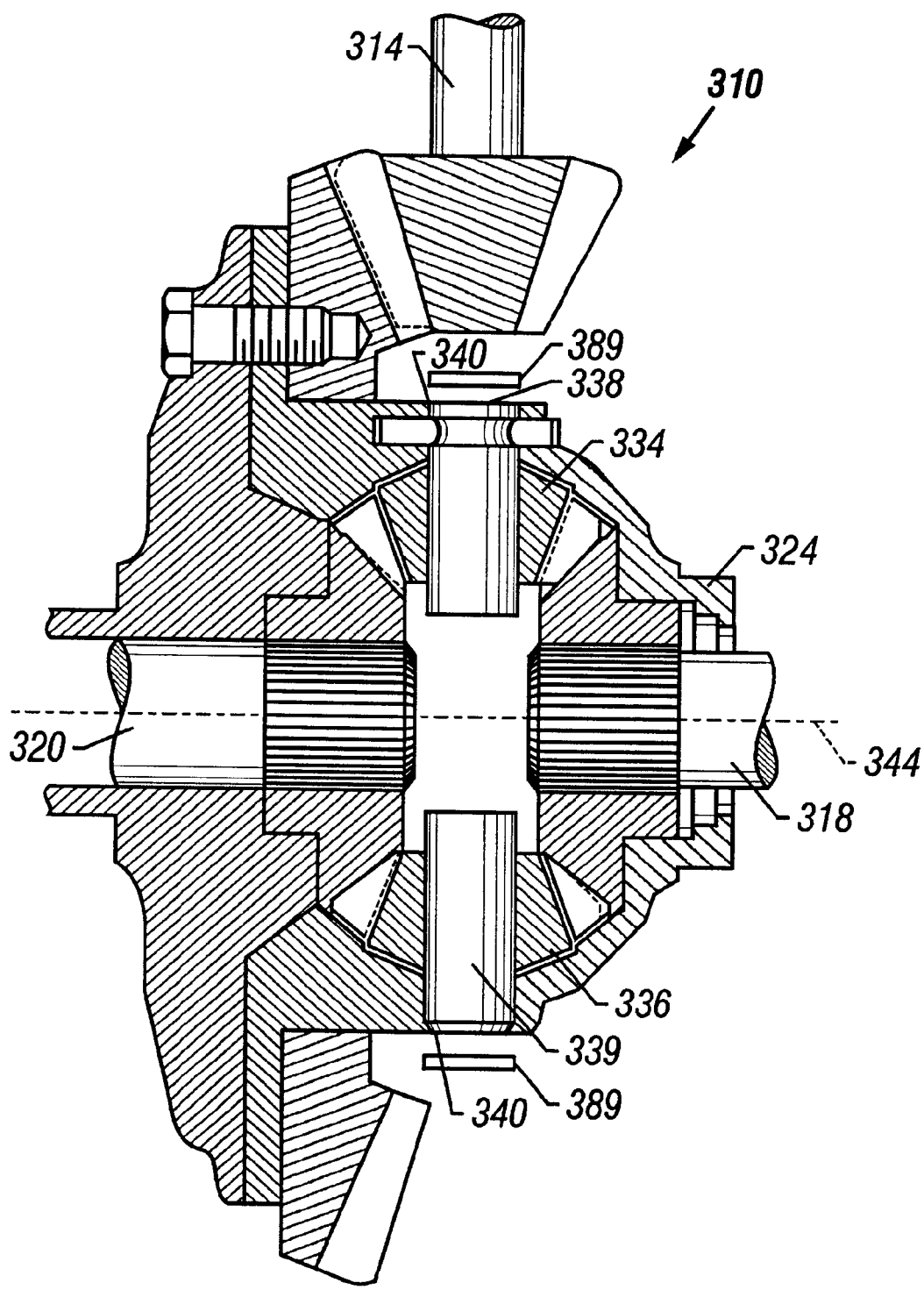
FIG. 6 is a cross sectional view of the differential illustrated in FIG. 5, showing the band brake installed.

The fourth preferred embodiment of the present invention illustrated in FIGS. 5–6 also employs an external braking element, but applies braking force upon one or more brake blocks 382 located between the planet gears 334, 336. Only one brake block is visible in FIGS. 5–6, the other brake block 382 being located on the opposite side of the differential 310. The brake blocks 382 are wedge shaped elements preferably made of a conventional low-wear braking material. Each brake block 382 has ends 390, 392 which are preferably curved to match the edges of the planet gears 334, 336 and/or the shape of the planet gear pivots 338, 339. Two different types of brake block shapes are shown by way of example in FIGS. 5a and 5b. The brake block 382 of FIG. 5a is capable of applying brake force against the edges of the planet gears 334, 336 and the brake block 382 of FIG. 5b is capable of applying brake force against the edges of the planet gears 334, 336 and their respective pivots 338, 339 in a manner described below. Each brake block 382 has a post or other raised portion 394 extending from the outside portion thereof and which extends through a respective aperture 396 in the differential housing 324 in much the same way as the pivots 338, 339 extend through apertures 340 in the differential housing 324. The planet gear pivots 338, 339 are attached for rotation with their respective planet gears 334, 336.

The outer differential case (not shown) of the differential 310 has apertures for the drive shaft 314 and axles 318, 320 as described above with reference to the third preferred embodiment. The differential 310 is preferably provided with a lever 384 extending through an aperture in the outer differential case in a manner that will be described below with reference to the levers 692, 792 of the seventh and eighth preferred embodiments of the present invention. The lever 384 is preferably pivotably attached at an end within the outer differential case to a connection element 388. The lever 384 and the connection element 388 are preferably attached as shown in FIG. 5 to a band 389 encircling the differential housing 324. The lever 384, connection element 388, and band 389 therefore form a band brake. Specifically, when the lever 384 is pivoted counterclockwise to move the lower end thereof (visible in FIG. 5) to the right, the connection element 388 is rotated to tighten the band 389 (in a manner well known to those skilled in the art) about the differential housing 324. Movement of the lever 384 back to its original position therefore loosens the band 389. It will be appreciated by one having ordinary skill in the art that many other conventional assemblies and elements can be used to tighten and loosen the band 389, including conventional band brake devices. For example, a cable, rod, or other linking device extending outside of the differential housing 324 can instead be used to actuate the connection element 388. Also, the band 389 itself can extend outside of the outer differential case to be pulled for releasably tightening the band 389 about the differential housing 324. Alternatively, the band 389 can be pivotably attached at two points directly to a rod extending from the outer differential case and which can be pushed to either side to releasably tighten the band 389 about the differential housing 324. Such other assemblies and elements perform the same function of permitting releasable tightening of the band 389 from outside of the outer differential case.

With reference to FIGS. 5 and 6, the band 389 (not shown in FIGS. 5a and 5b) preferably runs about the path followed by the pivots 338, 339 and the brake blocks 382 as they orbit about the differential axis 344. When the lever 384 is moved (e.g., pulled as described above), the band 389 is tightened and comes into contact with the raised portions 394 of the brake blocks 382 extending outside of the differential housing 324. Further tightening of the band 389 presses the raised portions 394 and the brake blocks 382 toward the center of the differential 310 and thereby wedges the brake blocks 382 between adjacent planet gears 334, 336 or between adjacent planet gears 334, 336 and their pivots 338, 339. The amount of pressure exerted upon the lever 384 is proportional to the amount of planet gear braking caused by the brake blocks 382. Therefore, a user can exert any desired gear braking force from substantially no planet gear braking to fully locking the planet gears 334, 336 from rotation depending upon the amount of traction loss experienced. This adjustment can be made while the differential 310 is operating.

It will be appreciated by one having ordinary skill in the art that a large number of brake block shapes are possible which are capable of performing the above-described wedging action when compressed by the band 389. The use of wedging brake blocks to slow gear movement is well known to those skilled in the art, as are the block shapes which are capable of gear braking without damaging machine chatter and without binding between the brake blocks and the gears. Therefore, such blocks and block shapes are not discussed further herein. In addition, the particular shape of the raised posts 394 on the brake blocks 382 can vary significantly while still performing the function of providing a surface which can be pressed by the band 389 when the band 389 is tightened. Also, rather than employ the band assembly just described to exert a compressive force against the raised portions 394 of the brake blocks 382, the actuator and brake shoe assembly described above with respect to the third preferred embodiment of the present invention can instead be used. In this arrangement, the brake shoes would be actuated toward the raised portions 394 of the brake blocks 382, thereby pressing the brake blocks 382 into frictional engagement with the adjacent gears and/or pivots 338, 339 to brake these elements. Further pivoting of the brake shoes would result in greater braking by the brake blocks 382 through a virtually infinite range of braking forces, with the amount of braking being controllable based upon the degree of actuation of the actuators. Such other manners of brake block compression fall within the spirit and scope of the present invention.

The preferred wedge shape of the brake blocks 382 described above and illustrated in the figures functions to rub against and slow planet gear rotation when the brake blocks 382 are forced between the planet gears 334, 336. It should be noted, however, that the brake blocks 382 can instead be shaped to wedge against the side gears in a similar manner (i.e., by employing tapered brake block sides facing the side gears 330, 332 and/or by employing a brake block shape which frictionally engages the ends of the axles 318, 320 protruding through the side gears 330, 332 when pressed. Although not preferred, the brake blocks 382 can even be shaped as just described and have curved ends 390, 392 as described above for braking of both the side and planet gears 330, 332, 334, 336).

The band assembly 384, 388, 389 just described for tightening about the brake blocks 382 to brake the differential can be employed in other manners to accomplish gear braking. For example, the band 389 need not tighten and press against brake blocks 382 as just described. In alternative embodiments of the present invention, no brake blocks 382 are employed. Instead, the band 389 tightens about ends of the pivots 338, 339 which can be made to extend past the differential housing 324 in much the same way that the ends of the pivots 238, 239 in the third preferred embodiment (see FIG. 3) extend past the differential housing 224 to selectively engage brake shoes 282. Like the pivot ends in the third preferred embodiment, the exposed pivot ends can be shaped in a variety of different ways to engage the band 389 (including without limitation flat pivot ends, cone-shaped pivot ends matching a V-shaped band, rounded pivot ends matching a bowed band, and the like).

Figure 7A:
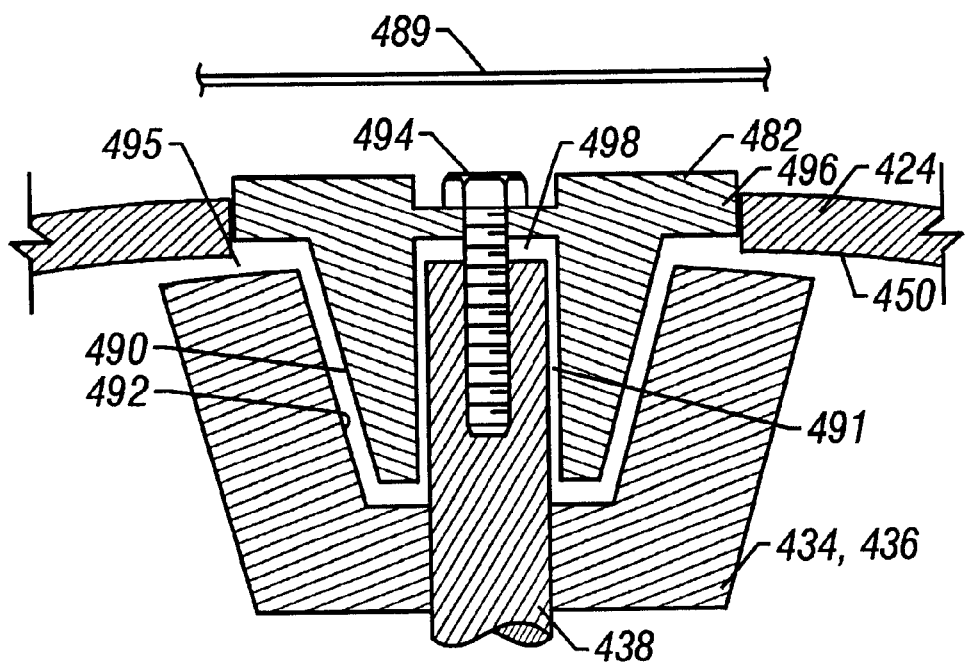
FIG. 7a is a cross sectional view of a first cone clutch element type installed on a differential according to a fifth preferred embodiment of the present invention.
Figure 7C:
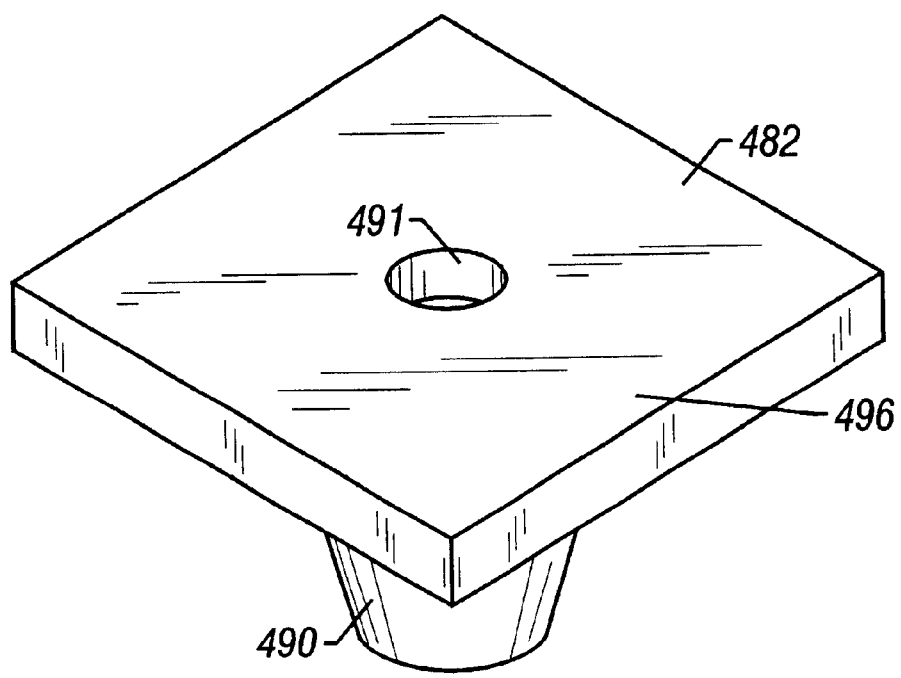

A band assembly such as that described above can be employed in a number of other applications for braking against the planet gears of the differential. For example, in another embodiment of the present invention illustrated in FIGS. 7a and 7c, a cone clutch element 482 is located upon each pivot 438, 439 upon which is mounted a planet gear 434, 436 (such as pivots 238, 239 of the third preferred embodiment described above and illustrated in FIGS. 3 and 4). A band 489 is preferably connected to a lever and lever arm (not shown) of the same type shown in FIG. 5, and runs about the differential housing 424 in the same manner as shown in FIGS. 5 and 6, but instead tightens about the cone clutch elements 482 located at the ends of the pivots 438, 439. Each cone clutch element 482 preferably has a central aperture 491 for fitting upon an end of the pivot 438, 439 and a tapered portion 490 which is axially received within a mating recess 492 in a respective planet gear 434, 436. The cone clutch elements 482 can be retained upon the ends of the pivots 438, 439 in a number of different manners. For example, each cone clutch element 482 can be attached to an end of the pivot 438, 439 by a conventional threaded fastener 494 which is threaded enough in the pivot 438, 439 to retain the cone clutch element 482 upon the pivot 438, 439 but which is loose enough to permit the fastener 494 to spin with the pivot 438, 439 when the planet gears 434, 436 spin. Most preferably, the head of the fastener 494 is recessed in the cone clutch element 482 as shown in FIG. 7a. To prevent the cone clutch elements 482 from rotating with the pivots 438, 439 when the planet gears 434, 436 begin to spin, the fit between the pivots 438, 439 and the cone clutch elements 482 is preferably a light clearance fit. Also or alternatively, the outer end of the cone clutch element 482 can be faceted or otherwise shaped and recessed within the differential housing 424 to prevent rotational movement of the cone clutch element 482. In the preferred embodiment of the present invention shown in FIGS. 7a–7d, the outer end of the cone clutch elements 482 shown has a square shape recessed within a square aperture 495 in the differential housing 424.

Figure 7B:
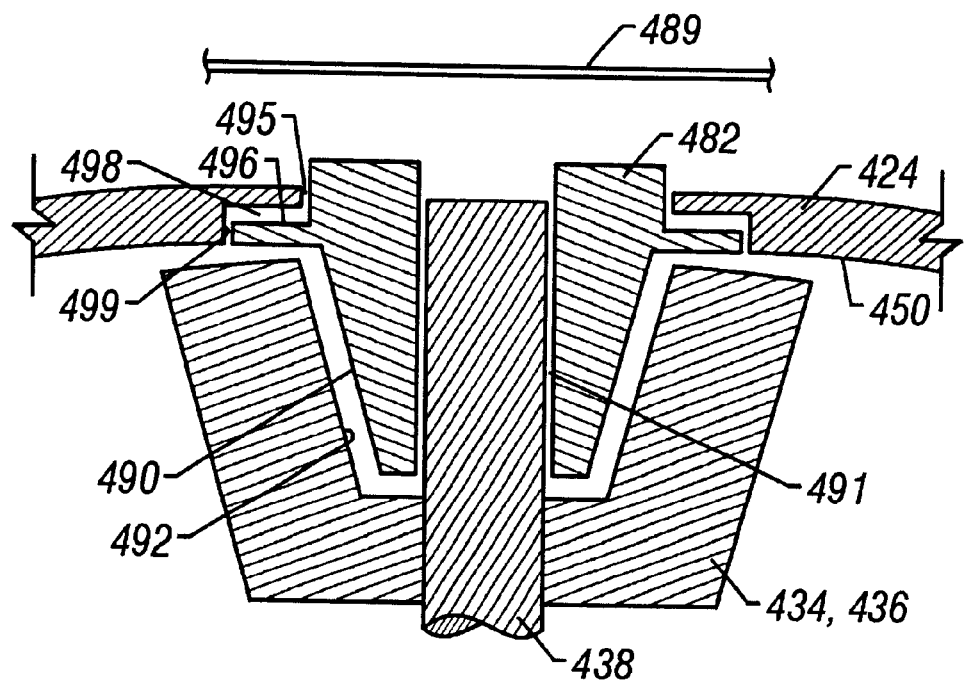
FIG. 7b is a cross sectional view of a second cone clutch element type installed on a differential according to the fifth preferred embodiment of the present invention.
Figure 7D:
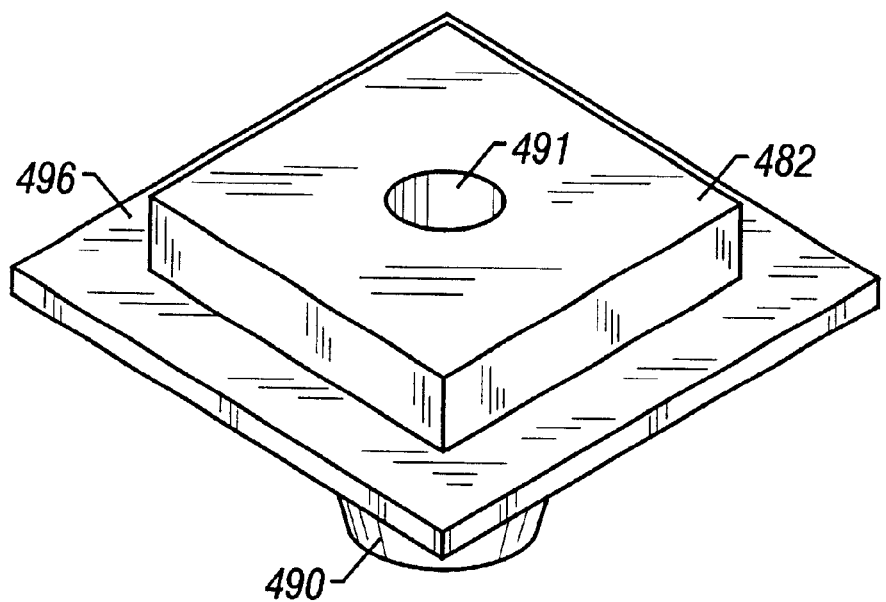
FIG. 7d is a perspective view of the cone clutch element shown in FIG. 7b.

In another embodiment illustrated in FIGS. 7b and 7d, the cone clutch elements 482 each preferably have a faceted shoulder 496 (square as shown in the figures) which preferably fits within a matching recess 499 in the interior wall 450 of the differential housing 424. The cone clutch elements 482 of FIGS. 7b and 7d are therefore trapped between the planet gears 434, 436 and the interior wall 450 of the differential housing 424 and cannot rotate with the pivots 438, 439 and the attached planet gears 434, 436. The cone clutch elements 482 of the type shown in FIGS. 7b and 7d also preferably have a clearance fit about the pivots 438, 439 to enable the pivots 438, 439 and attached planet gears 434, 436 to pivot with respect thereto.

In both cone clutch element embodiments shown in FIGS. 7a–7d, a clearance 498 exists (extra space between the fastener head and the end of the pivots 438, 439 in FIG. 7a or between the shoulder 496 of the cone clutch element 482 and the recessed face of the inside housing wall 450 in FIG. 7b) to permit the cone clutch elements 482 to move axially along the pivots 438, 439 in varying degrees of engagement with the planet gears 434, 436. While springs can be employed to maintain the cone clutch elements 482 a maximum distance in the clearances 498 from the planet gears 434, 436 (when not pushed thereto by the band 489 as discussed below), preferred embodiments of the present invention leave the cone clutch elements 482 floating within their respective recesses.

In operation, the band 489 can be tightened as described above, thereby pressing against the outer ends of the cone clutch elements 482. Gradually increasing pressure moves the cone clutch elements 482 in their clearances 498 into increased engagement with the planet gears 434, 436. Specifically, as the cone clutch elements 482 are pressed by the tightening band 489, the tapered portions 490 of the cone clutch elements 482 are pressed further into the recesses 492 in the rear faces of the planet gears 434, 436. Increased pressure from the band 489 generates an increased amount of friction between the cone clutch elements 482 and the planet gears 434, 436, thereby making the planet gears 434, 436 and the attached pivots 438, 439 increasingly harder to rotate. Because the user can control the amount of tightening pressure upon the band 489, the user can control the amount of braking exerted upon the planet gears 434, 436 via the cone clutch elements 482 through a virtually infinite range of braking forces and even during differential operation.

It should be noted that the pivots 438, 439 illustrated in FIGS. 7a and 7b can be replaced by a single pivot extending across the differential housing in much the same way as the single pivot of the first preferred embodiment described above and illustrated in FIG. 1. In such case, the planet gears 434, 436 would be mounted upon the ends of the pivot for rotation with respect thereto. Also, one having ordinary skill in the art will appreciate that a number of other manners exist for retaining the cone clutch elements 482 in operative position in the differential, such as by recessing the shoulders 496 of the cone clutch elements 482 into grooves in the differential housing 424 (which grooves are wide enough to create clearance for movement of the cone clutch elements 482 toward and away from the planet gears 434, 436), attaching cone clutch elements 482 of the type shown in FIGS. 7a and 7c to the ends of the pivots 438, 439 via conventional bearings pressed onto the ends of the pivots 438, 439 and into the central aperture 491 of the cone clutch element 482, etc. Such alternative manners for retaining the cone clutch elements 482 fall within the spirit and scope of the present invention.

Figure 8A:
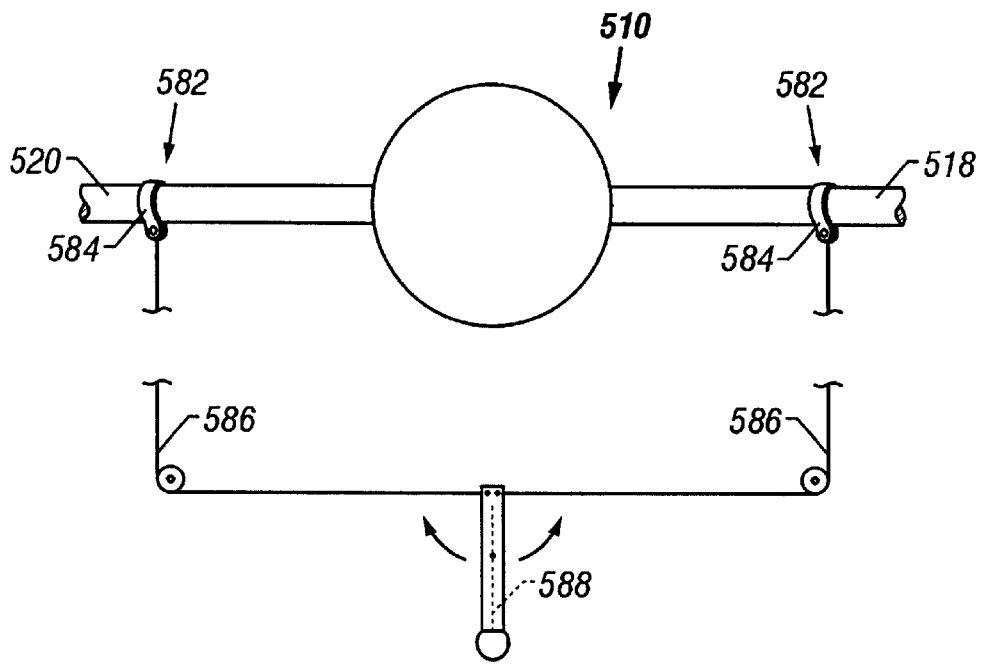
FIG. 8a is a plan view of a first braking system according to a sixth preferred embodiment of the present invention.

With reference to FIG. 8a, a sixth embodiment of the present invention relies upon selective loading of the axles extending from the differential (indicated generally at 510). In particular, each axle 518, 520 has a conventional band brake (indicated generally at 582) thereabout. The band brakes 582 each preferably has a band 584 connected to a cable 586 extending to a user accessible location on the vehicle, such as to a dashboard or control panel of the vehicle. Tension on the cables 586 can be controlled by a user via a knob, lever, or like device 588 attached in a conventional manner to the ends of the cables. Preferably, actuation of the knob or lever in one direction will increase tension on a cable 586 leading to one axle 518, while actuation of the knob or lever in an opposite direction will increase tension on another cable 586 leading to the other axle 520. By increasing tension on a cable 586 in this manner, the band brake 582 attached to the respective axle 518, 520 is tightened around the axle 518, 520, thereby increasing a braking force on the axle 518, 520 to transfer torque to the opposite axle 520, 518. When one wheel begins to lose traction, a user can actuate the knob or lever to increase tension of the cable 586 leading to the axle corresponding to the slipping wheel. Preferably, the tension upon the cable 586 is proportional to the adjustment of the knob or lever 588 so that a user may apply a range of desired tensions to the cable 586 and a corresponding range of braking forces to the connected axle and wheel in response to the amount of traction loss experienced by the wheel. Because such adjustment does not interfere with the operation of the differential, it can be performed even during differential operation.

Figure 8B:
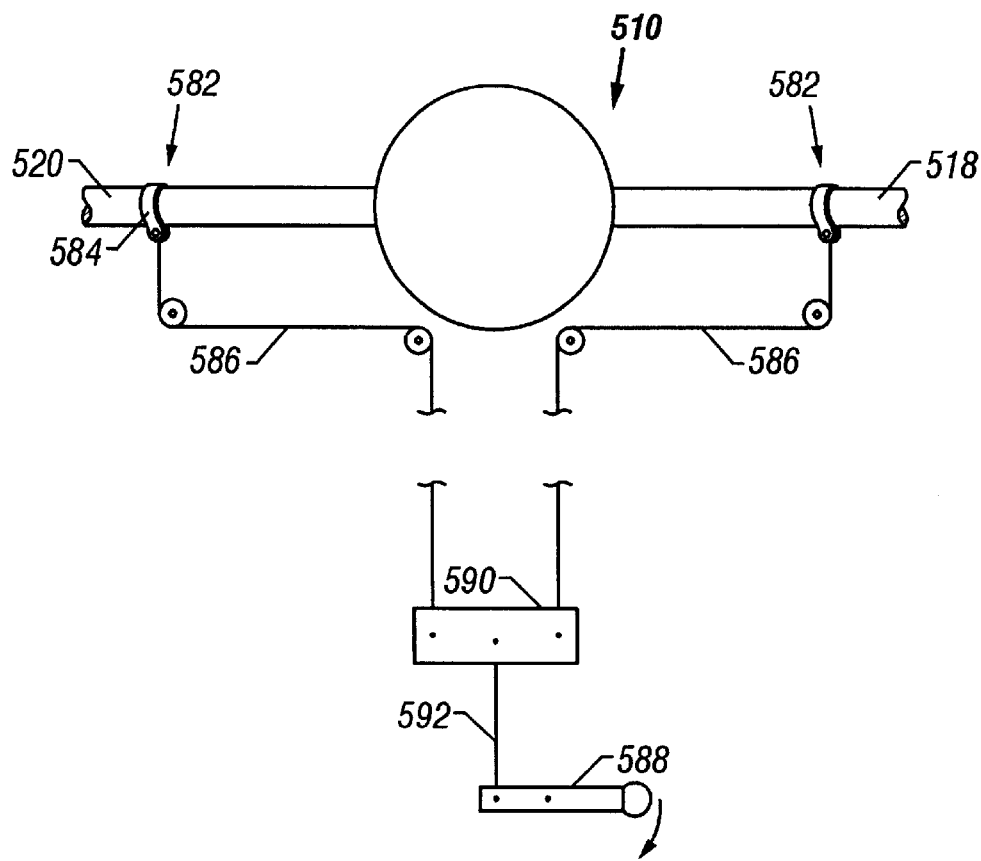
FIG. 8b is a plan view of a second braking system according to the sixth preferred embodiment of the present invention.

An alternative preferred embodiment related to the embodiment just described is illustrated in FIG. 8b. Rather than connect a cable 586 from each band brake 582 directly to a user-operable knob, lever, or other such device, the cables 586 lead to a connection element 590 between the knob or lever and the axles. A third cable 592 extends from the connection element 590 to the knob or lever. As such, when a user actuates the knob or lever, the connection element 590 is pulled, exerting tension upon both cables 586 and causing the band brakes 582 to brake the axles 518, 520. Although the braking force is therefore exerted upon both axles 518, 520, the increase in torque required to turn the slipping wheel transfers additional power to the non-slipping wheel for better performance.

Both embodiments of the present invention illustrated in FIGS. 8a and 8b and described above employ conventional band brakes which can take any number of different forms. For example, the band brakes can be a strap, strip, or band passed around the associated axle and having ends connected together at a connection point from which a cable extends. Alternatively, the band brakes can be in a form similar to the braking mechanism shown in FIG. 5 of the fourth preferred embodiment of the present invention (both ends of the strap, strip or band connected together at a connection element pivotably actuatable by a cable or lever for tightening the strap, strip, or band). Still other well known band brake types can be used in a similar manner as the band brakes discussed above.

Figure 9:
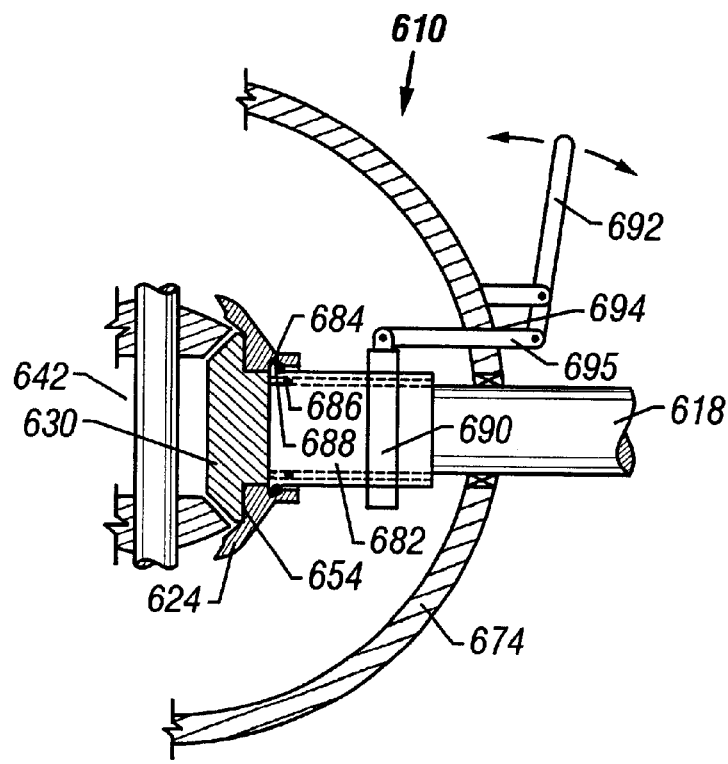
FIG. 9 is a partial cross sectional view of a differential according to a seventh preferred embodiment of the present invention.

With reference to FIG. 9 in which a seventh preferred embodiment of the present invention is shown, the side gears 630, 632 of the differential 610 can be loaded by elements riding upon the side gears 630, 632. For sake of clarity, only half of the differential 610 is shown in FIG. 9, the side not shown being identical to the side shown. Each axle 618, 620 in the illustrated embodiment has a tubular element 682 in telescoping relationship with the axle 618, 620 and mounted thereon for rotation with respect to the axle 618, 620. Preferably, the tubular element 682 extends through the differential housing 624 and to the side gear 630, 632 associated with the axle 618, 620 upon which the tubular element 682 is mounted. Also preferably, conventional seals 684, 686 are located on the inside and outside of the tubular element 682 to prevent leakage between the differential housing 624 and the tubular element 682, and between the tubular element 682 and the axle 618, 620, respectively. The tubular elements 682 are sized to axially slide along the axles 618, 620.

Each tubular element 682 preferably has a flared or enlarged inner end 688 facing the associated side gear 630, 632. Therefore, the tubular elements 682 can be shifted axially toward and in frictional contact with the side gears 630, 632, with the flared or enlarged inner ends 688 of the tubular elements 682 riding upon the rear faces 654 of the side gears 630, 632. The tubular elements 682 can be shifted in this manner via several different conventional mechanisms and assemblies. For example, each tubular element 682 can have a thrust bearing 690 mounted to a portion of the tubular element 682 located outside of the differential housing 624 as shown in FIG. 9. A conventional lever 692 can be connected to the thrust bearing 690 via a linking element 695 extending through the outer differential case 674 as shown in FIG. 9 to move the tubular element 682 toward and away from the associated side gear 630, 632. Alternatively, the lever 692 itself can extend out of the outer differential case 674 (in which case the fulcrum point for the lever can be a frame of the vehicle, a body part of the vehicle, the outer differential case 674, etc.) to move the tubular element 682 toward and away from the associated side gear 630, 632. The linking element 695 (or lever 692) preferably extends outside of the outer differential case 674 through an aperture 694 sealed from leakage by a boot, gasket, or other well known sealing element or assembly. To lower binding forces upon the thrust bearing 690 during actuation thereof by the lever 692 and linking element 695, more than one linking element 695 can be connected to the lever 692 and to points of the thrust bearing 690 circumferentially around the axle 618, 620 as desired. Only one linking element 695 is shown in FIG. 9 for clarity. By forcing the tubular element 682 upon the rear face 654 of a side gear 630, 632, the tubular element 682 generates braking force against the side gear 630, 632. Because the amount of force exerted upon the side gear 630, 632 by the tubular element 682 is controlled by the amount of force exerted by a user upon the lever 692 and the linking element 695, a user can generate an infinite range of braking forces upon the side gears 630, 632 via the lever 692 and the linking element 695 even during differential operation. The particular lever 692 and linking element 695 arrangement illustrated in FIG. 9 is only one manner in which to connect the tubular element 682 to an actuatable member (cable, lever, thrust rod, or the like) outside of the outer differential case 674. Other arrangements would be recognized by one having ordinary skill in the art, and therefore fall within the spirit and scope of the present invention.

As an alternative to tubular elements 682 mounted for rotation with the axles 618, 620 of the differential 610, the tubular elements 682 can instead be sealed with respect to the differential housing 624 and axles 618, 620 via seals permitting relative rotation of the tubular elements 682 and the axles 618, 620. Such seals are well known to those skilled in the art and are not therefore described further herein. In this alternative embodiment, the tubular elements 682 do not rotate with the axles 618, 620, and can therefore be directly connected to a lever 692 (such as by conventional pivots on the tubular elements 682). As with the preferred embodiment described above, the lever 692 can be operated directly or indirectly by a user to push and pull the tubular element 682 connected thereto toward and away from the associated side gear 630, 632 to increase, decrease, or eliminate braking force upon the side gear 630, 632 as desired.

The tubular elements 682 can take a number of different forms well known to those skilled in the art. For example, the tubular elements 682 can be tubes such as those shown in the figures. Especially where rotation of the tubular element 682 with the axles 618, 620 is not desired, the tubular elements 682 can instead be sleeve or thrust bearings rated to accept anticipated axial thrust loads exerted during braking. The tubular elements 682 can be shorter or longer than that shown in FIG. 9, and need not necessarily have a flared or enlarged inner end. However, a flared or enlarged end is preferred to provide a large braking surface area against the rear faces 654 of the side gears 630, 632. For this same purpose, the inner ends of the tubular element 682 can be tapered to fit within a matching tapered recess in the rear faces 654 of the side gears 630, 632 or can alternatively be shaped to receive a tapered extension of the rear faces 654 so that the frictional engagement of the side gears 630, 632 is accomplished with a significantly larger surface area (much like a cone clutch or the cone clutch elements 482 described above with reference to the fifth preferred embodiment of the present invention). In short, the tubular elements 682 can be any element in translational relationship with the axles 618, 620 capable of exerting braking thrust loads against the side gears 630, 632 of the differential 610.

Although the preferred embodiment of the present invention shown in FIG. 9 has tubular elements 682 which extend between the side gears 630, 632 and positions between the differential housing 624 and the outer differential case 674, it is possible to extend the tubular elements 682 through the outer differential case 674. In this manner, the elements or mechanisms (e.g., levers 692 and linking element 695) connected to the tubular elements 682 for axially moving the tubular elements 682 as described above can be located fully outside of the outer differential case 674. Regardless of whether the tubular elements 682 rotate with the axles 618, 620 (see above), the tubular elements 682 in such an arrangement can be provided with conventional seals and bearings as appropriate at the outer differential case 674.

Figure 10:
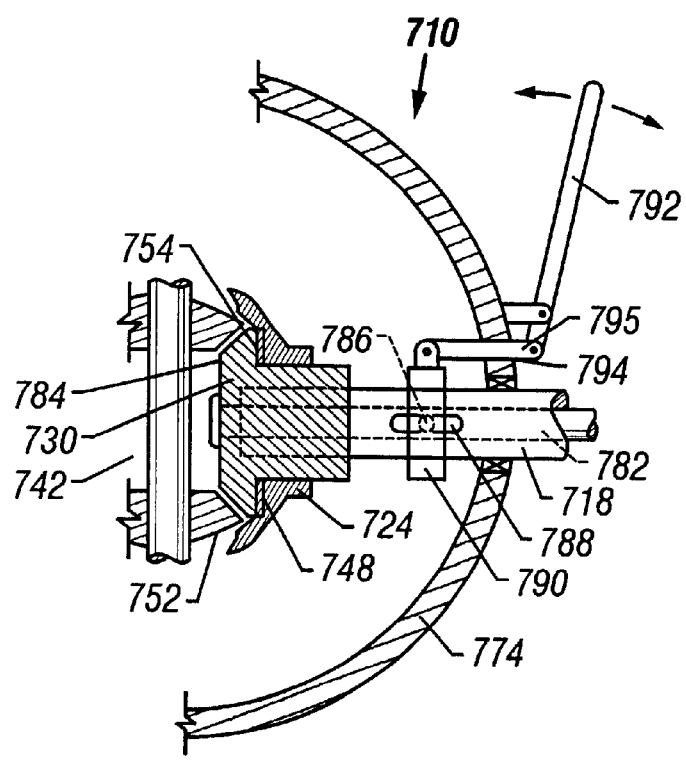
FIG. 10 is a partial cross sectional view of a differential according to an eighth preferred embodiment of the present invention.

An eighth preferred embodiment of the present invention is illustrated in FIG. 10. For sake of clarity, only half of the differential 710 is shown in FIG. 10, the side not shown being identical to the side shown. In this embodiment, at least a portion of each axle 718, 720 is hollow and receives therein a braking shaft 782 which is axially slidable in the axles 718, 720. The braking shafts 782 are preferably guided within the axles 718, 720 via a clearance fit, and preferably rotate with the axles 718, 720. As shown in FIG. 10, the hollow areas of the axles 718, 720 permit the braking shafts 782 to be slid into the differential housing 724, past the side gears 730, 732, and into the internal chamber 742 of the differential 710. The ends of the braking shafts 782 are preferably knurled, flanged, enlarged, or have an element or elements attached thereto which can press against the front faces 784 of the side gears 730 when the braking shafts 782 are pulled in a direction outside of the differential housing 724. Although not required to practice the invention, the enlarged ends of the braking shafts 782 can be attached to the front faces 784 of the side gears 730 in any conventional manner, such as by welding, brazing, fastening via threaded fasteners, and the like. Brake pads 748 are preferably attached in a well known manner to either or both the interior walls 752 of the differential housing 724 and the rear faces 754 of the side gears 730, 732 in substantially the same manner as the brake pads 48 described in the first preferred embodiment of the present invention. By axially shifting the braking shafts 782 in the axles 718, 720, the enlarged ends of the braking shafts 782 can exert a pulling force upon the side gears 730, 732 to press the side gears 730, 732 toward the interior walls 752 of the differential housing 724 and to thereby brake the side gears 730, 732 against the brake pads 748. This movement is relative to the axles 718, 720, which can remain in their axial positions with respect to the differential housing 724. In other words, axial shifting movement of the braking shafts 782 preferably axially shifts the side gears 730, 732 with respect to the axles 718, 720 to which they are splined.

The braking shafts 782 can be axially shifted in a number of manners well known to those skilled in the art. For example, the embodiment of the present invention shown in FIG. 10 employs a pins 786 extending from each braking shaft 782 outward through an elongated aperture 788 in the axles 718, 720. By axially moving thrust bearings 790 located on the axles 718, 720 and attached to the pins 786, the thrust bearings 790 push against the pins 786 of the braking shafts 782 (which rotate with the axles 718, 720) and thereby axially shift the braking shafts 782 within the axles 718, 720. Preferably, the elongated apertures 788 are of sufficient length to permit movement of the braking shafts 782 in a range of positions corresponding to different axial forces exerted upon the side gears 730, 732. Like the lever 692 and linking element 695 of the seventh preferred embodiment described above, a lever 792 can be connected to the thrust bearing 790 via one or more linking elements 795 extending through a sealed aperture 794 in the outer differential case 774 in a conventional manner. Alternatively, the lever 792 itself can extend outside of the outer differential case 774 as described above with reference to lever 692 of the seventh preferred embodiment. A user can actuate the lever 792 directly or indirectly with a range of different pressures to generate an infinite range of braking forces upon the side gears 730, 732 even during differential operation.

It should be noted that although brake pads 748 are preferred in this embodiment of the present invention, brake pads 748 are not necessary to practice the invention. Instead, the side gears 730, 732 can be pushed directly against the interior walls 752 of the differential housing 724 for braking thereon. In addition, the thrust bearings 790 can be replaced by any number of elements capable of sliding along the rotating axles 718, 720, including without limitation sleeves, rings, tubes, and the like. Also, it is possible to extend the braking shafts 782 and the hollow portion of the axles 718, 720 to positions outside of the outer differential case 774 if desired. In such an arrangement, the thrust bearings 790, pins 786 and elongated apertures 788 can all be located outside of the outer differential case 774 so that the connection between the levers 792, axles 718, 720 and braking shafts 782 are also located outside of the outer differential case 774 (thereby avoiding the need to extend the lever 792 into the differential case 774 via the sealed aperture 794).

Figure 11A:
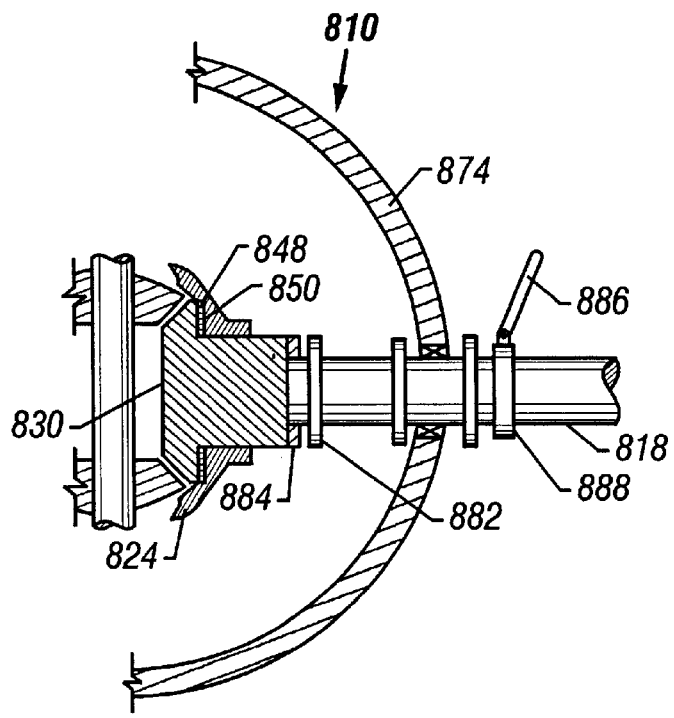
FIG. 11a is a partial cross sectional view of a differential according to a ninth preferred embodiment of the present invention.
Figure 11C:
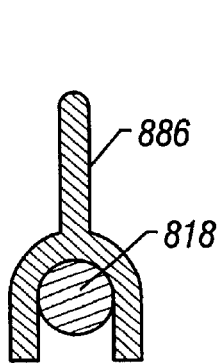
FIG. 11c is a detail view of the actuator shown in FIG. 11b.
Figure 11B:
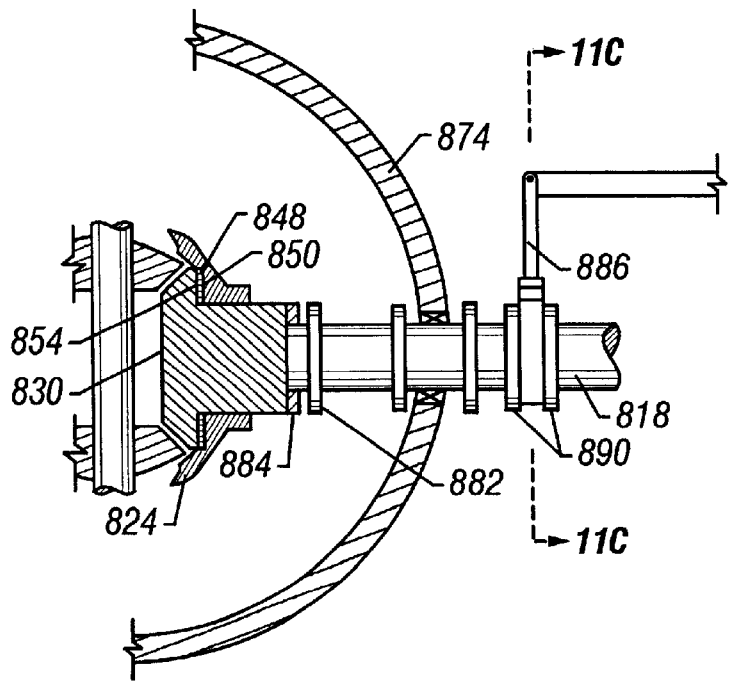

FIGS. 11a and 11b illustrates two versions of a ninth preferred embodiment of the differential 810 according to the present invention. For sake of clarity, only half of the differential 810 is shown in FIGS. 11a and 11b, the side not shown being identical to the side shown. In this embodiment (as with a number of differential applications), the axles 818, 820 of the differential 810 are axially secured with respect to the side gears 830, 832 in a conventional manner, and each axle 818, 820 has a limited amount of axial play in the differential 810. The axles 818, 820 and their respective side gears 830, 832 are therefore axially slidable through a range of axial positions with respect to the differential housing 824, and can be limited from excessive movement in either direction by bearings, collars, flanges, hubs, and the like on either side of the outer differential case 874 (see FIG. 11a) or on either side of the differential housing 824 (not shown). Although not required, brake pads 848 are preferably attached in a conventional manner to one or both of the interior housing walls 850 and the rear faces 854 of the side gears 830, 832 as discussed above in more detail with reference to the first preferred embodiment of the present invention. The side gears 830, 832 can be braked by exerting an axial force against the axles 818, 820, thereby causing the side gears 830, 832 attached thereto to ride against the brake pads 848. Alternatively or in addition, each axle 818, 820 can have a flange 882 attached in a conventional manner to or extending outwardly therefrom beside the differential housing 824. The axles 818, 820 can therefore be braked by exerting an axial force against the axles 818, 820 to bring the flanges 882 into frictional engagement with the differential housing 824. For improved braking of the flanges 882, brake pads 884 can be attached in a conventional manner to the differential housing 824 beside the flanges 882 as shown or to the flanges 882.

Axial forces can be exerted upon the axles 818, 820 in several ways well known to those skilled in the art. For example, each axle 818, 820 can have a bearing 888 attached therearound at a location outside of the outer differential case 874 as shown in FIG. 11a. A lever 886 extending from each bearing 888 is actuatable by a user to push or pull the bearing 888 axially and to thereby exert an axial force against the entire axle 818, 820 and to shift the side gears 830, 832 attached thereto into frictional engagement with the brake pads 848 or to shift the flanges 882, 884 toward and in frictional engagement with the brake pads 884 on the differential housing 824. A user can exert a range of forces against the lever 886 to generate a range of braking forces as desired - even during differential operation. It should be noted that the brake pads 848 and side gears 830, 832 cause braking when force is exerted upon the axles 818, 820 in one axial direction, while the flanges 882, 884 riding upon the brake pads 884 on the differential housing 824 cause braking when force is exerted upon the axles 818, 820 in an opposite axial direction. Although both braking manners can be employed in a differential 810, both are not needed for the same axle 818, 820 and are shown in FIG. 11a only for purposes of illustration.

As shown in FIG. 11b, each axle 818, 820 can instead have a set of collars 890 located thereon preferably outside of the outer differential case 874 (although like the bearings 888 described above, the collars 890 can be located upon the axles 818, 820 inside the outer differential case 874 if desired, in which case the actuating lever 886 should be extended outside of the outer differential case 874 via an aperture therein). The collars 890 are either integral to the axles 818, 820 or are attached thereto in a conventional manner. A lever 886 preferably extends from a position between the collars 890 and can be actuated by a user to axially shift the axles 818, 820 and the attached side gears 830, 832 as described above. Most preferably, each lever 886 has an apertured or forked end (best shown in FIG. 11c) through which the respective axle 818, 820 extends. Still other well known manners exist by which the rotating axles 818, 820 are axially movable, each of which falls within the spirit and scope of the present invention.

Figure 12:
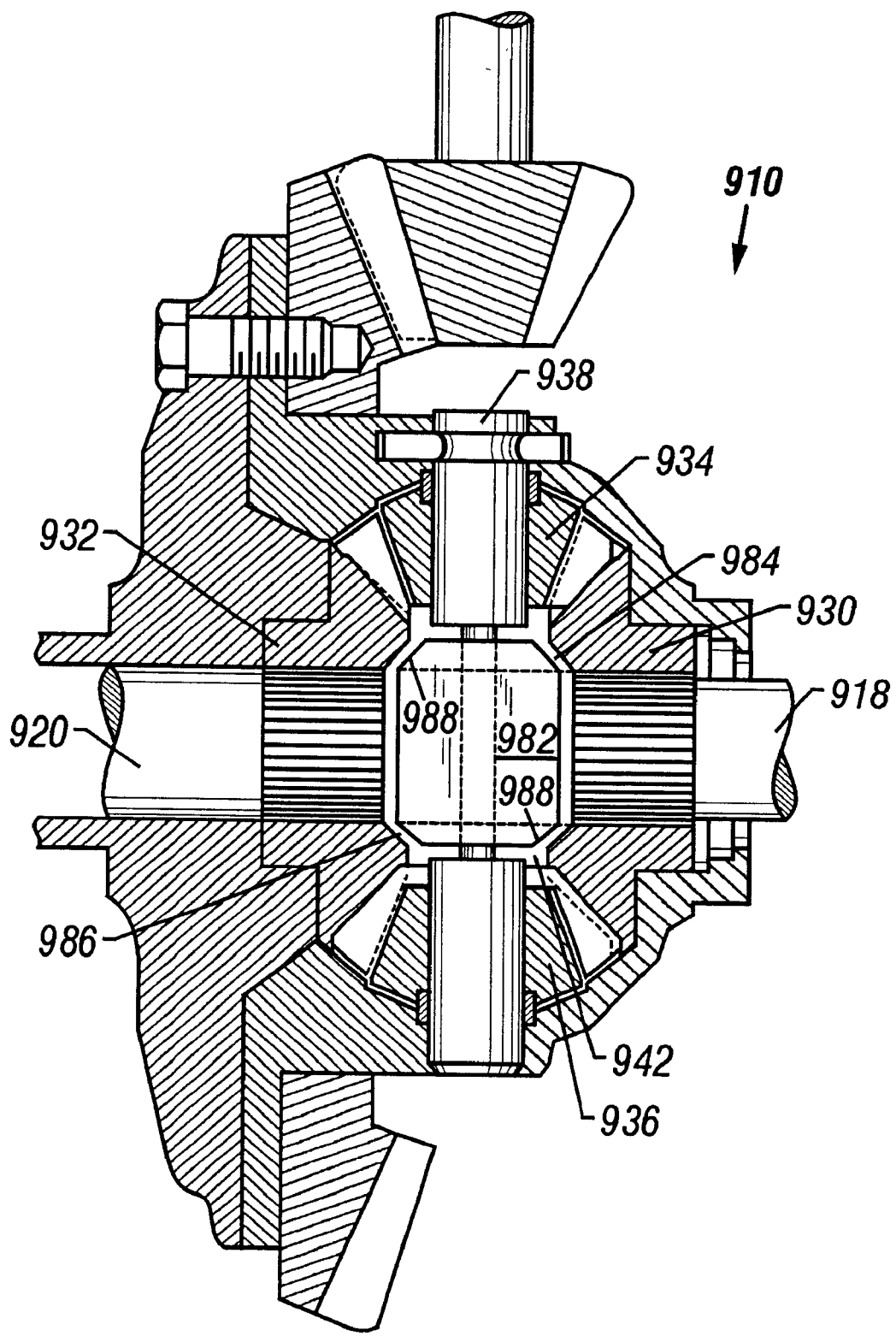
FIG. 12 is a cross sectional view of a differential according to a tenth preferred embodiment of the present invention.

The tenth preferred embodiment of the present invention shown in FIG. 12 also preferably relies upon limited axial movement of the axles 918, 920, but generates braking forces in another manner. Within the internal chamber 942 of the differential 910 (between the planet gears 934, 936 and the side gears 930, 932) is located a friction element 982 which preferably extends within matching recesses 984, 986 in the side gears 930, 932. Preferably, the friction element 982 is secured in a conventional manner to the pivot 938 upon which the planet gears 934, 936 are mounted for rotation. For example, the pivot 938 can be integral with the friction element 982 (e.g., stamped, pressed, molded, cast, or milled integrally therewith), fastened thereto, welded, and the like. Preferably however, the pivot 938 (or a reduced diameter portion thereof as shown in FIG. 12) passes fully through an aperture in the friction element 982. The friction element 982 is preferably a plug which is tapered at opposite ends to fit within the matching tapered recesses 984, 986 in the side gears 930, 932. Therefore, when the axles 918, 920 are axially loaded and shifted by the user, such as by the manner described above with reference to the ninth preferred embodiment of the present invention, the axles 918, 920 move toward or away from the tapered ends of the friction element 982, thereby increasing or decreasing the frictional engagement and braking of the axles 918, 920 through an infinite range of braking forces controllable by a user during differential operation.

The matching tapered end and recess arrangement just described is most preferred because it has a relatively large capacity for generating frictional braking forces over a large frictional surface area and with relatively little movement of the axles 918, 920 to do so. However, it should be noted that the friction element 982 can be replaced by a number of other friction elements which are differently shaped and which interact with differently-shaped axle ends. For example, the friction element 982 can be a stack of wear disks or pads held together and secured to the pivot 938 in a conventional manner, a pair of posts extending laterally from the pivot 938 toward the side gears 930, 932 and axles 918, 920, etc. The friction element 982 can also be a block having no tapers and presenting a flat surface to the ends of the axles 918, 920 so that axial movement of the axles 918, 920 generates planar rubbing contact of the friction element 982 with the axles 918, 920. Alternatively, the friction element 982 can have a convex, concave, or other curved surface facing a matching concave, convex, or other curved surface on the ends of the axles 918, 920. The friction element 982 can even have recesses within which fit matching tapered ends of the axles (i.e., a shape configuration opposite of that shown in FIG. 12). The friction element 982 is preferably made of powdered metal, but can instead be made from a number of other materials suitable for generating sufficient braking friction when the axle ends are pressed there against, including without limitation brass, rubber, urethane, nylon, steel, aluminum, iron, plastic, or combinations thereof. To enhance braking results, a brake pad or other conventional braking element (not shown) can be attached in a conventional manner to the ends of the friction element 982, to the ends of the axles 918, 920, or to both the ends of the friction element 982 and the ends of the axles 918, 920.

It should be noted with reference to FIG. 12 that the friction element 982 can frictionally engage just the front faces 988 of the side gears 930, 932, just the end faces of the axles 918, 920, or both the front faces 988 of the side gears 930, 932 and the end faces of the axles 918, 920 as shown, depending upon the desired shape of the recesses 984, 986 and the friction element 982. For example, in those differential designs in which the axles 918, 920 do not extend fully through their respective side gears 930, 932, the friction element 982 can rub against one or more front surfaces of the side gears 930, 932. The shape relationship between the friction element 982 and the side gears 930, 932 can be any of the combinations discussed above with reference to the friction element-to-axle engagement (i.e., friction and side gears mating surfaces which are tapered or reverse-tapered, curved, flat, and the like). In short, the ends of the friction element 982 are preferably shaped as desired to match with a shape of the axle ends, the front faces 988 of the side gears 930, 932, or a shape defined by both the axle ends and the front faces 988 of the side gears 930, 932.

In the preferred embodiment of the present invention illustrated in FIG. 12, the axles 918, 920 are axially translatable through a limited range to create frictional braking against the friction element 982. In an alternative embodiment, braking shafts telescope within the axles 918, 920 and are axially slidable therethrough to ride against the friction element 982. Preferably, types of braking shafts, their operation, and their manner of connection are substantially the same as those described above with regard to the eighth preferred embodiment illustrated in FIG. 10. Like the friction element embodiment illustrated in FIG. 12, this alternative embodiment permits a user to exert a range of forces upon the axles 918, 920 even during differential operation to generate an infinite range of braking forces upon either axle 918, 920 or side gear 930, 932.

Figure 13A:
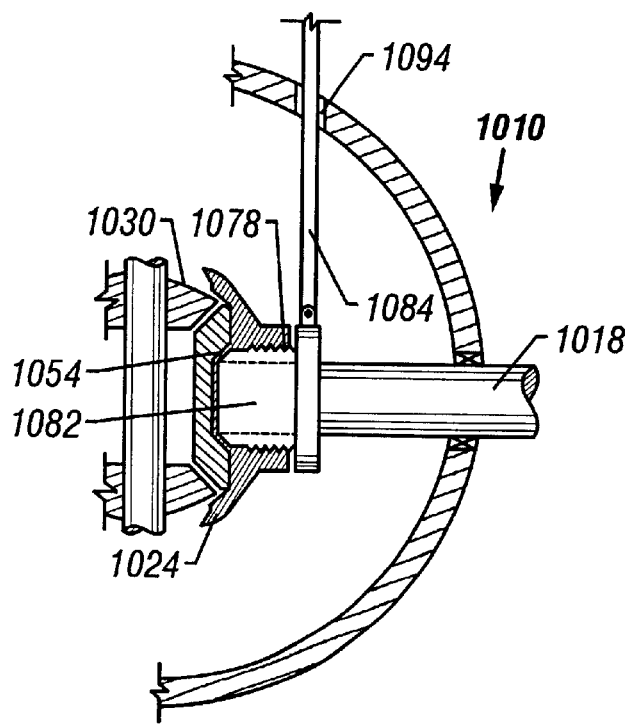
FIG. 13a is a partial cross sectional view of a differential according to an eleventh preferred embodiment of the present invention.
Figure 13B:
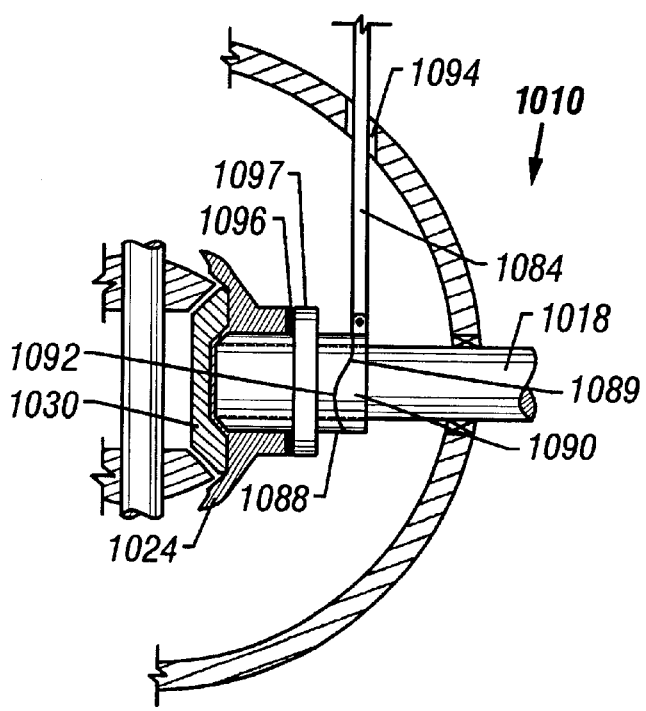
Figure 13C:
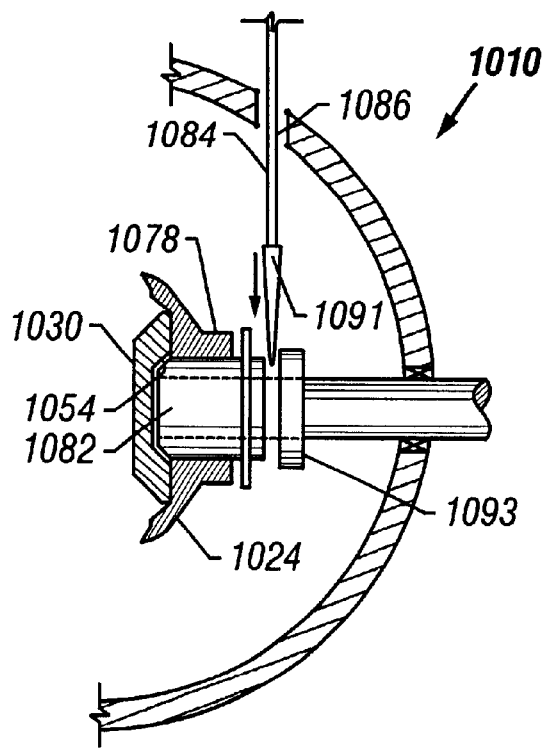
FIG. 13c is a partial cross sectional view of the differential illustrated in FIGS. 13a and 13b, showing an alternative cone clutch element arrangement to those shown in FIGS. 13a and 13b.

Three differential designs in which side gears or axles are braked by cone clutch elements are shown in FIGS. 13a–13c. For sake of clarity, only half of the differential 1010 is shown in each of FIGS. 13a–13c, the side not shown being identical to the side shown. This eleventh preferred embodiment of the present invention preferably employs cone clutch elements 1082 similar in operation to the cone clutch elements 482 of the fifth preferred embodiment described above. The cone clutch elements 1082 are movable axially with respect to the side gears 1030, 1032 to selectively exert braking pressure against the recessed rear faces 1054 of the side gears 1030, 1032. While this movement can be performed in many ways (e.g., axially pushing or pulling the cone clutch elements 1082 in a manner such as that described in the seventh preferred embodiment described above, etc.), the cone clutch elements 1082 can be more precisely controlled by using a threaded cone clutch element or by using a rotary cam design as shown in FIGS. 13a and 13b. With reference first to the embodiment shown in FIG. 13a, the cone clutch elements 1082 are externally threaded to thread into axle apertures 1078 of the differential housing 1024, and preferably do not rotate with their respective axles 1018, 1020. Therefore, turning the cone clutch elements 1082 causes the cone clutch elements 1082 to thread toward or away from the side gears 1030, 1032. The threaded connection between the cone clutch elements 1082 and the differential housing 1024 permits a user to very precisely apply a range of desired frictional forces against the side gears 1030, 1032, preferably from a fully locked position to a position in which the cone clutch elements 1082 do not contact or only lightly contact the side gears 1030, 1032.

The externally threaded cone clutch elements 1082 can be turned in the axle apertures 1078 in a number of ways well known to those skilled in the art. For example, the outer ends of each cone clutch elements 1082 can have secured thereto a lever 1084 which extends from the cone clutch elements 1082 through a slotted aperture 1094 (sealed from leakage in a manner as described above with reference to the seventh and eighth preferred embodiments) for actuation by a user. By pushing or pulling the lever 1084, the cone clutch elements 1082 are turned and threaded into or out of the differential housing 1024 and toward or away from the recessed rear faces 1054 of the side gears 1030, 1032. Preferably, the pitch of the exterior threads on the cone clutch elements 1082 is steep enough so that significant axial movement of the cone clutch elements 1082 can be generated by relatively slight rotation of the lever arms 1084. However, if desired, threads having a lesser pitch and a lever arm having a larger adjustment sweep will permit more precise braking force control by the user. Like the cone clutch elements 482 of the fifth preferred embodiment, the cone clutch elements 1082 can be made from a number of possible materials, including without limitation steel, aluminum, iron and other metals, plastic, refractory materials, or combinations thereof, but most preferably are made from brass.

Controlled movement of the cone clutch elements 1082 can instead be accomplished by camming action of a cam 1088 on the rear of each cone clutch element 1082 against a cam member 1090 secured to the axle 1018, 1020 as shown in FIG. 13b. Preferably, the cam member 1090 is secured to each axle 1018, 1020 against axial movement therealong and does not rotate with the axles 1018, 1020. For example, the cam member 1090 can be a bearing secured against axial movement along the axle 1018, 1020. Each cam member 1090 preferably has a ramped or curved cam surface 1089 which does not rotate with the axle 1018, 1020, and which faces the rear of the cone clutch element 1082 as shown in FIG. 13b. The cone clutch element 1082 preferably also has a ramped or curved cam surface 1092 facing the cam member 1090. Rotation of the cam member 1090 causes the cam surface 1089 of the cam member 1090 to ride against the cam surface 1092 of the cone clutch element 1082, thereby axially moving the cone clutch element 1082. The cone clutch element 1082 is preferably spring loaded by compression springs 1096 (e.g., coil springs, Belleville springs, and the like) connected in a conventional manner to or trapped between a shoulder 1097 of the cone clutch element 1082 and the differential housing 1024. Therefore, each cone clutch element 1082 is biased away from its corresponding side gear 1030, 1032 and into engagement with its corresponding cam member 1090. One having ordinary skill in the art will recognize that many other spring types can be used and placed in different locations on the cone clutch element 1082 to perform this same biasing function.

The cone clutch element type shown in FIG. 13b is prevented from rotating with its corresponding axle 1018, 1020, but can slide axially therealong as described above. The cone clutch element 1082 can be prevented from rotation with the axle 1018, 1020 in a number of different conventional ways, such as by flanges, pins, or other elements (not shown) seated within recesses in the differential housing 1024 and capable of axial movement therein. In the illustrated preferred embodiment, the compression springs 1096 prevent rotation of the cone clutch elements 1082 with the axles 1018, 1020. Specifically, the cone clutch elements 1082 are attached in a conventional manner (e.g., welding, brazing, gluing, riveting, fastening with conventional fasteners, etc.) at one end to the differential housing 1024 and at another end to the shoulders 1097 of the cone clutch elements.

A lever arm 1084 connected to the cam member 1090 in a conventional fashion preferably extends from each cam member 1090 through a slotted aperture in the differential housing 1024, and can be pushed or pulled directly or indirectly by a user to rotate the cam member 1090. Like the cone clutch element design illustrated in FIG. 13a, this assembly permits a user to adjust the braking force exerted upon the side brakes 1030, 1032 through an infinite range even while the differential is operating.

Figure 13D:
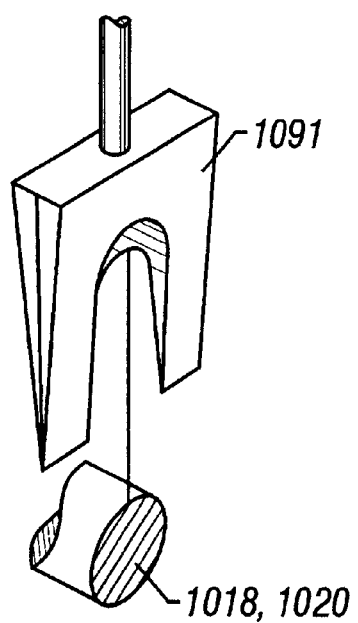
FIG. 13d is a detail perspective view of the cam block shown in FIG. 13c.

In yet another cone clutch element braking design, the cone clutch elements 1082 are preferably seated in the axle apertures 1078 and are biased away from their respective side gears 1030, 1032 in the same manner as described above with reference to the embodiment illustrated in FIG. 13b (i.e., capable of limited axial movement along the axles 1018, 1020 but substantially no rotational movement with the axles 1018, 1020, and spring biased in an outward direction). However, the cone clutch elements 1082 are cammed into frictional engagement with the side gears 1030, 1032 by a cam block 1091 (see also FIG. 13d). The cam blocks 1091 are preferably in the shapes of wedges located between a rear face of each cone clutch element 1082 and a flange 1093 of each axle 1018, 1020. Each cam block 1091 is preferably forked to slide onto an axle 1018, 1020 between the flanges 1093 and the cone clutch elements 1082. With such motion, the cam blocks 1091 wedge the cone clutch elements 1082 axially along the axles 1018, 1020 toward the side gears 1030, 1032 to frictionally engage the side gears 1030, 1032. Each cam block 1091 is preferably connected to a thrust rod 1084 extending through an aperture 1086 in the differential housing 1024 for direct or indirect actuation by a user. To brake a side gear 1030, 1032, a user pushes against the thrust rod 1084, thereby forcing the wedge-shaped cam block 1091 between the cone clutch element 1082 and the axle flange 1093 corresponding to the side gear 1030, 1032 and forcing the cone clutch element 1082 into frictional engagement with the side gear 1030, 1032. Like the other cone clutch embodiments of the present invention, the amount of braking force is preferably controllable by the user (through an infinite range) by controlling the amount of force exerted upon the thrust rod 1084.

It will be appreciated by one having ordinary skill in the art that the particular manner in which the cam block 1091 is forced can be different than that shown in FIG. 13c. For example, the thrust rod 1084 can instead connect to one or both sides of the forked cam block 1091 and extend away from the cam block 1091 in direction opposite to that shown in FIG. 13c. A user would therefore pull the thrust rod 1084 (rather than push) to wedge the cam block 1091 between the cone clutch element 1082 and the axle flange 1093 to brake a side gear 1030, 1032. Also, the cam block 1091 need not necessarily wedge between an axle flange 1093 and the cone clutch element 1082 as illustrated and described. Specifically, the axle flanges 1093 can be replaced by any element against which the cam blocks 1091 can be wedged to move the cone clutch elements 1082 (including without limitation thrust bearings axially fixed upon the axles 1018, 1020, collars secured to the axles 1018, 1020, and the like).

In each of the cone clutch element embodiments illustrated in FIGS. 13a–13c, the cone clutch elements 1082 are illustrated as having tapered portions extending into tapered recesses in the rear faces 1054 of the side gears 1030, 1032. However, it should be noted that the same braking effect can be achieved if the side gears 1030, 1032 have rear facing tapered portions extending into tapered recesses in the cone clutch elements 1082. In addition, the particular shape of the recesses and of the cone clutch elements need not be tapered as shown in FIGS. 13a–13c. The side gears 1030, 1032 can instead have recesses which are rounded, stepped, or shaped in another manner to match rounded, stepped, or other cone clutch element end shapes.

Figure 14:
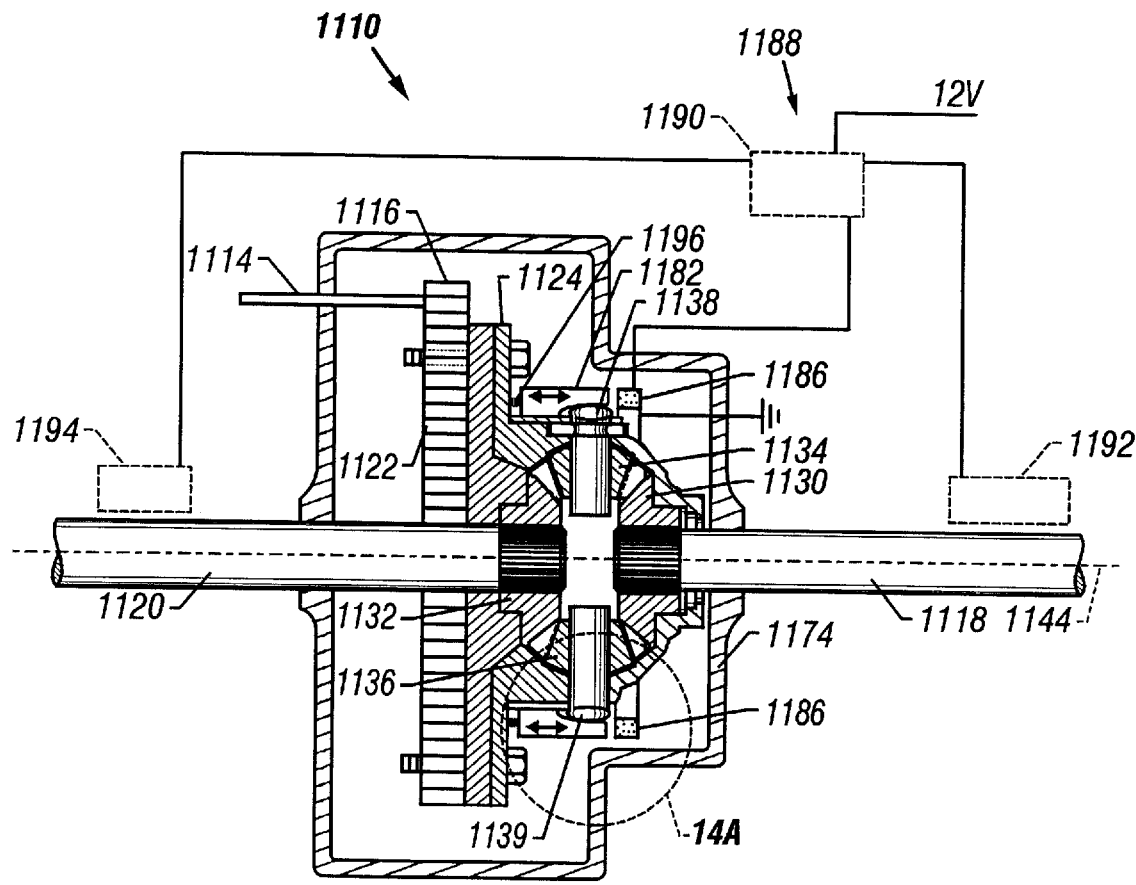
FIG. 14 is a cross sectional view of a differential according to a twelfth preferred embodiment of the present invention.
Figure 14A:
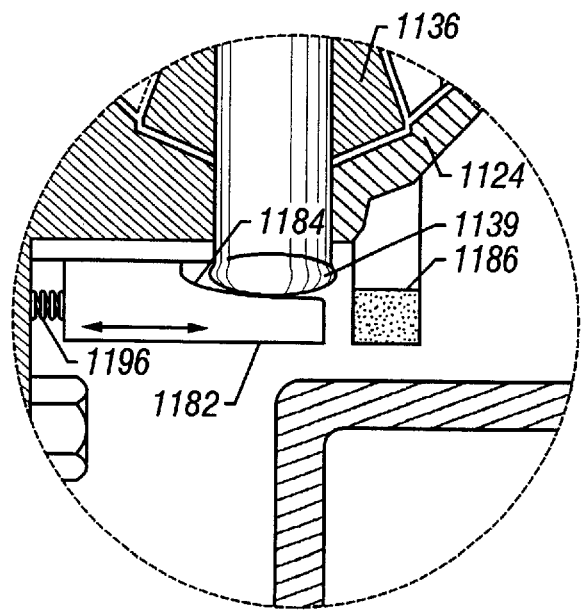
FIG. 14a is a detail view of FIG. 14.

A twelfth preferred embodiment of the present invention is shown in FIGS. 14 and 14a. The differential 1110 of this embodiment, like those of the second through the fifth preferred embodiments described above, is capable of traction control by selective braking of the planet gears 1134, 1136. More specifically, the planet gears 1134, 1136 of the differential shown in FIG. 14 are braked by their engagement with a brake ring 1182 mounted upon the outside of the differential housing 1124.

In the differential of the twelfth preferred embodiment, the planet gears 1134, 1136 are mounted for rotation with their respective pivots 1138, 1139 which extend through the differential housing 1124. The pivots 1138, 1139, their connection to the planet gears 1134, 1136, and their positions in the differential housing 1124 are substantially the same as the pivots 234, 235 of the third preferred embodiment described above.

A brake ring 1182 is preferably mounted to the differential housing 1124 beside the pivots 1138, 1139, and is slidable axially with respect to differential axis 1144. In particular, the brake ring 1182 preferably has a spline connection with a tubularly-shaped outer portion of the differential housing 1124. The cross-sectional outer shape of the differential housing 1124 is therefore preferably constant for a distance of the differential housing 1124 along the differential axis 1144, thereby enabling the brake ring 1182 to slide along the outside of the differential housing as will be described below.

The brake ring 1182 preferably has an inner wall 1184 defining a braking surface against which the ends of the pivots 1138, 1139 extending outside of the differential housing 1124 rub when the brake ring 1182 is slid into contact therewith. The inner wall 1184 can take a number of different shapes capable of contacting the ends of the pivots 1138, 1139, but (for enhanced braking performance) most preferably has a curved shape matching the enlarged curved ends of the pivots 1138, 1139 shown. Although preferred, the connection between the brake ring 1182 and the differential housing 1124 need not be splined. Indeed, any connection permitting relative axial movement of the brake ring 1182 upon the differential housing 1124 can be used instead, including a smooth surface interface between the differential housing 1124 and the brake ring 1182, an axial tongue and groove connection between these two elements, and the like. A stationary brake ring 1182 more effectively brakes the pivot ends than one that can react to spinning pivot ends by rotating upon the differential housing 1124. Therefore, each such alternative connection between the brake ring 1182 and the differential housing 1124 preferably does not permit rotation of the brake ring 1182 with respect to the differential housing 1124. For example, in the case of a smooth surface interface between the differential housing 1124, the brake ring 1182 is preferably keyed upon the outer differential housing 1124.

Particularly for brake rings 1182 which cannot rotate with respect to the differential housing 1124, contact between the brake ring 1182 and the ends of the pivots 1138, 1139 is only in locations on the circumference of the brake ring 1182 that are aligned with the pivots 1138, 1139. As such, the cross sectional shape of the brake ring 1182 shown in FIG. 14 need not be the same in other circumferential portions of the brake ring 1182 (and most preferably has a significantly smaller cross sectional shape to lower inertial forces of the brake ring). The brake ring 1182 can take any cross sectional shape desired in such other circumferential portions of the brake ring 1182. For purposes that will be described below, the brake ring 1182 is preferably made of a material responsive to magnetic force (a ferrous metal).

To provide sufficient room for the brake ring 1182 and its sliding movement described above, the bevel ring gear of the above preferred embodiments is preferably replaced with a conventional spur type ring gear 1122 as shown. Most preferably, the ring gear 1122 is connected in a conventional manner to a far end of the differential housing 1124 as shown to provide maximum space for the brake ring 1182 and its movement. However, the manner of connection of the ring gear 1122 is substantially the same as described above with regard to the other preferred embodiments of the present invention. To drive the ring gear 1122, another conventional spur gear 1116 on the drive shaft 1114 can be used in place of the pinion of earlier embodiments.

A magnetic coil 1186 is preferably located within the outer differential case 1174 but outside of the differential housing 1124 as shown in FIG. 14. The magnetic coil 1186 is preferably secured in any number of different manners to the inner surface of the outer differential case 1174, such as by brackets, straps, conventional fasteners, and the like (not shown). The magnetic coil 1186 is connected in a conventional fashion to a source of electrical power which can be controlled in any manner well known to those skilled in the art. For example, the magnetic coil 1186 can be controlled directly by a user via a switch which can be actuated to supply or to cut the supply of power to the magnetic coil. However, for a range of control over the magnetic coil 1186 (most preferred for permitting a user to exert a range of braking forces upon the planet gears 1134, 1136 as will be discussed below), the magnetic coil 1186 can be connected to a rheostat or other electrical controller (not shown) which is operable to supply a desired amount of power to the magnetic coil 1186. For purposes of illustration, however, the differential 1110 illustrated in FIG. 14 is instead connected to a control system 1188.

The control system 1188 represents only one type of system for automatically controlling the amount of braking applied to gears of the differential 1110, and is an alternative to the manually-operated levers, cables, and other user-actuatable devices of the above-described embodiments. Although many well known different system types and connection arrangements are possible, the preferred embodiment illustrated in FIG. 14 has a system controller 1190 powered the battery, alternator, or other power supply of the vehicle and connected to the magnetic coil 1186 and to axle counters 1192, 1194 on the axles 1118, 1120. The axle counters 1192, 1194 measure the speeds of their associated axles 1118, 1120, and send signals representative of the speeds to the system controller 1 190. The system controller compares the signals and, if a threshold ratio between the speeds is reached, supplies power to the magnetic coil 1186.

The system controller 1190 can take any form capable of comparing signal inputs and of supplying the connected device (e.g., the magnetic coil 1186) with power based upon the result of such comparison. The system controller 1190 can be a microprocessor, an analog circuit, or any other conventional electronic circuit. Such system controllers are well known to those skilled in the art and are not therefore described further herein.

The axle counters 1192, 1194 are conventional devices for measuring axle speed, and can take many forms. Such devices and their manner of connection and operation are also well known to those skilled in the art and are therefore not described further herein. It should be noted, however, that although axle counters 1192, 1194 are preferred in the present invention, the rotational speeds of the differential outputs (e.g., the axles 1118, 1120 and associated vehicle wheels) can be measured by conventional rotational speed sensing devices positioned to detect the rotational speed of the differential housing 1124, the elements being driven (e.g. wheels), or even the side gears 1130, 1132 themselves.

In operation, the system controller 1190 preferably monitors and compares the speeds of the axles 1118, 1120. The system controller 1190 is preferably factory-set or more preferably is user-set to supply power to the magnetic coil 1186 when the speed difference measured between the axles 1118, 1120 reaches a set level. Although the system controller 1190 can operate to simply turn power on to the magnetic coil 1186 when a threshold speed difference is detected, the system controller 1190 more preferably increases power to the magnetic coil 1186 as the detected speed difference between the axles 1118, 1120 increases. When the magnetic coil 1186 is powered, it preferably exerts a force upon the brake ring 1182, pulling the brake ring 1182 along the differential housing 1124 until the inner wall 1184 of the brake ring 1182 frictionally engages the ends of the pivots 1138, 1139 to brake the associated planet gears 1134, 1136. As power to the magnetic coil 1186 increases (in response to the system controller 1190 calculating an increasing speed difference between the axles 1118, 1120), the pulling force upon the ring 1182 increases to exert an increasing braking force upon the pivots 1138, 1139. Conversely, when the speed difference between the axles 1118, 1120 drops, the system controller 1190 preferably decreases power to the magnetic coil 1186 to lower braking force upon the pivots 1138, 1139.

The brake ring 1182 can be moved in an opposite direction (when the speed difference between the axles 1118, 1120 is lowered or no longer exists) in a number of conventional manners. In the preferred embodiment shown in figures, one or more extension springs 1196 bias the brake ring 1182 away from the pivots 1138, 1139 when no gear braking is called for. Although the extension springs 1196 are shown attached between the brake ring 1182 and the differential housing 1124, the extension springs 1196 can be attached between the brake ring 1182 and other elements of the differential as desired. Of course, numerous other biasing elements (leaf springs, Belleville springs, and the like) can be used to exert retracting force upon the brake rings 1182. The brake ring 1182 can instead be biased to its retracted position by one or more other magnets upon the differential housing 1124, outer differential case 1174, ring gear 1122, etc., or even by the magnetic coil 1186 powered in a conventional manner to reverse the magnetic force upon the brake ring 1182 and to thereby repel the ring gear 1122 away from the pivots 1138, 1139. Such biasing elements and their operation are well known to those skilled in the art and fall within the spirit and scope of the present invention.

In most preferred embodiments of the present invention, the system controller 1190 is user adjustable. Specifically, the threshold at which power is supplied to the magnetic coil 1186 can preferably be changed depending upon the operating conditions of the differential (e.g., a low threshold such as a 1.2:1 wheel speed ratio for vehicle operating conditions upon snow or ice, a higher threshold such as a 2.2:1 ratio for vehicle operating conditions upon grass, etc.). Highly preferred embodiments also permit a user to disable traction control as desired. The system controller is preferably adjustable by manipulation of an adjustment control (e.g., a rheostat or other such device connected to the system controller in a conventional manner) located in a user-accessible location on the vehicle.

As mentioned above, the amount of power supply to the magnetic coil 1186 preferably increases proportionally with respect to the axle speed difference calculated by the system controller 1190. In alternative embodiments of the present invention, this relationship is adjustable by a user (e.g., a greater or lesser amount of power supplied to the magnetic coil 1186 for each axle speed difference calculated by the system controller 1190). The relationship between the axle speed difference and the power supplied to the magnetic coil 1186 by the system controller 1190 can be linear or non-linear, can be factory-set, can be changeable via a knob, dial, lever or other user-operable control to a number of different factory-set options, or can even be programmed by a user. Control over the relationship between calculated axle speed difference and the power supplied to the magnetic coil 1186 allows a user to set the gear braking characteristics of the differential based upon preferred performance, operating conditions, environment, and the like.

Although a magnetic coil 1186 is preferred as mentioned above, other magnet types can instead be used to attract and/or repel the brake ring 1182. For example, the magnetic coil 1186 can be replaced by a ring-shaped magnet, a series of magnets circumferentially spaced about the differential axis 1144 inside the outer differential case 1174, and the like. Because the differential housing 1124, the brake ring 1182, and the pivots 1138, 1139 are rotating with respect to the magnet and the outer differential case 1174, it is even possible (though not preferred) to mount a single magnet within the outer differential case, whereby the magnet attracts and repels continuously advancing portions of the brake ring 1182 as the brake ring rotates with respect thereto to draw or repel the brake ring 1182 along the differential housing 1124.

One having ordinary skill in the art will appreciate that the magnetic coil 1186 (or other alternative magnet type used) can be in a number of different locations in the differential 1110 to still create the desired controlled motion of the brake ring 1182 with respect to the differential housing 1124. For example, the magnetic coil 1186 can be located upon the differential housing 1124 or ring gear 1122 adjacent to the brake ring 1182, in which case power can be supplied by leads and a rotary electrical contact to the rotating magnetic coil 1186 in a conventional manner. The brake ring 1182 itself can be an electromagnet connected in this manner and pushed or pulled toward a ferrous element either defining a portion of the differential (such as the differential housing 1124, ring gear 1122, etc.) or attached thereto beside the brake ring 1182. It will be appreciated that the brake ring 1182 need not be made of a ferrous metal for response to magnetic force by the magnetic coil 1186. Instead, one or more ferrous elements or magnets can be attached to the brake ring 1182 to move the brake ring 1182.

As mentioned above, the brake ring 1182 can take a number of different shapes and forms. For example, the braking surface of the brake ring 1182 can be a curved surface such as that shown in FIG. 14, can be shaped to cup the sides of the pivots 1138, 1139 and/or can be shaped to match the shapes of the pivot ends. As another example, the brake ring 1182 need not necessarily be a continuous ring surrounding the differential housing 1124. One or more braking elements can instead be slidably mounted upon the outer surface of the differential housing 1124 (such as by being mounted upon dedicated tracks or rails, being fitted within axially-extending dovetailed grooves in the outer surface of the differential housing 1124, etc.). Alternatively, one or more braking elements in the shape of fingers or plates each pivotably mounted at one end to the differential housing 1124 can be pivoted under magnetic force from the magnetic coil 1186 into engagement with the pivots 1138, 1139. In each such alternative embodiment, a braking element is movable with respect to the differential housing 1124 under magnetic force into frictional engagement with the pivots 1138, 1139.

It will be appreciated by one having ordinary skill in the art that magnetic control systems such as the one employed in the twelfth preferred embodiment described above and illustrated in FIG. 14 can be used in many different differential embodiments. Specifically, the magnetic coil 1186 can be positioned in different locations within the outer differential case 1174 to exert magnetic force against one or more of the side gears 1130, 1132, planet gears 1134, 1136, axles 1118, 1120, or elements mounted thereupon. For example, the magnetic coil 1186 can encircle the orbit path of the pivots 1138, 1139 for pulling or pushing the pivots 1138, 1139 or planet gears 1134, 1136, can be positioned beside the differential housing 1124 for pushing or pulling the side gears 1134, 1136, or can be positioned beside collars on the axles 1118, 1120 for pushing or pulling the axles and connected side gears 1134, 1136. In each such embodiment, the element pushed or pulled is preferably either ferrous, has one or more ferrous elements or magnets attached thereto that are responsive to the magnetic force exerted by the magnetic coil, or is itself an electromagnet powered by the system controller 1190. These alternative embodiments fall within the spirit and scope of the present invention.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the particular type illustrated in the figures is only one manner of arranging the gears in a differential. The present invention relates to braking of differential gears or axles or pivots connected thereto, and not to any particular gear arrangement, differential housing shape, or gear type or number. The principles of the present invention can therefore be employed in many other well known differentials with the same advantageous results. By way of example only, the differential housings shown in the figures can have their ring gears (22, 122, 222 . . . ) axially located in a large number of different positions. Although a ring gear which is not axially centered around the planet gears (34, 36, 134, 136, 234, 236 . . . ) permits easier access to the planet gears (34, 36, 134, 136, 234, 236 . . . ) or planet gear pivots (38, 138, 139, 238 . . . ) for braking these elements, the ring gear (22, 122, 222 . . . ) can be located in virtually any axial position with respect to the planet gears (34, 36, 134, 136, 234, 236 . . . ) as is well known in conventional differentials.

Also, the pinion gear (16, 116, 216 . . . ), the ring gear (22, 122, 222 . . . ), the planet gears (34, 36, 134, 136, 234, 236 . . . ), and the side gears (30, 32, 130, 132, 230, 232 . . . ) need not necessarily be bevel gears as shown. Some or all of these gears can be replaced by, for example, spur gears arranged meshed with one another in a conventional fashion. A conventional differential in which such gears are employed is disclosed in U.S. Pat. No. 3,528,323 issued to Kamlukin, the disclosure of which is incorporated herein by reference insofar as it relates to spur gear differential arrangements and their operations. Many of the preferred embodiments described above and illustrated in the figures are readily adaptable to alternative conventional differential designs. With reference to the Kamlukin-style spur gear differential mentioned above for example, the brake shoes 282 of the third preferred embodiment can ride upon the planet gear tooth faces of the differential, the brake blocks of the fourth preferred embodiment can be seated between adjacent planet gears and beneath a differential housing, the side gear and axle braking embodiments can be used without significant modification, etc. Still other differential gear arrangements employing different gear types can be used in conjunction with one or more preferred embodiments of the present invention disclosed herein.

Additionally, the differential housing (24, 124, 224 . . . ) of the differentials disclosed herein represent only one type of differential housing in which the present invention can be employed. The shape of the differential housing (24, 124, 224) can differ significantly in other alternative embodiments. For example, some differential housing designs need not fully enclose the side and planet gears (30, 32, 130, 132, 230, 232 . . . and 34, 36, 134, 136, 234, 236 . . . ) as shown. The differential housing need only provide surfaces against which the gears or other braking elements press in their braking operations and/or to provide support for keeping the gears, brake blocks, or other elements in proper position with respect to the other differential elements. In some conventional differential designs, a differential housing (24, 124, 224 . . . ) is not even required for operation of a number of the preferred embodiments disclosed herein (although an outer differential case (74, 174, 274) is most preferably used). For example, the planet gear pivots (38, 138, 238 . . . ) can be seated within the ring gear (22, 122, 222 . . . ) rather than in a differential housing (24, 124, 224 . . . ) in a manner similar to the differential disclosed in U.S. Pat. No. 5,386,742 issued to Irikura et al., the disclosure of which is incorporated herein by insofar as it relates to the transaxle design employed therein. In such case, the planet gears (34, 36, 134, 136, 234, 236 . . . ) can brake against an inner surface of the ring gear (22, 122, 222 . . . ), band brakes can be employed to brake the vehicle axles, and the side gears can be braked in the same manners as described above with regard to the preferred embodiments of the present invention.

It will also be appreciated by one having ordinary skill in the art that in each of the preferred embodiments described above and illustrated in the figures, the actuation elements can be operated manually or automatically. For example, a user can manually push, pull, tighten, loosen, or otherwise adjust any of the levers, cables, and other actuation elements to generate the actuating motions disclosed. Alternatively, these actuation elements can be connected to and be operated by conventional actuators, motors, muscle wires (see above) and the like in manners well known to those skilled in the art. Conventional systems exist that can detect wheel slip and axle speed differentiation in many different ways. Such systems can be used in conjunction with the actuation elements to generate automatic gear braking (in the manners described above and illustrated in the figures) when wheel slip or axle speed differentiation is detected by automatically actuating the actuation elements via the conventional actuators, motors, etc. With reference only by way of example to the twelfth preferred embodiment of the present invention described above and illustrated in FIG. 14, axle speed detectors can feed axle speed information to a microprocessor, analog circuit, or other electronic circuit capable of comparing the detected axle speeds and signaling an actuator to apply an appropriate desired braking force (whether pre-programmed or otherwise) preferably based upon the difference in axle speeds, differential speed, user-indicated operating conditions (snow or grass, etc.).

We claim:

1. An inexpensive variable traction control differential for a low-speed vehicle having at least two axles, the differential comprising:

a planet gear;

a side gear meshed with the planet gear and coupled to an axle for rotation therewith;

a brake element located adjacent at least one of the side gear and the axle;

an actuation element simultaneously movable with side gear rotation from a first position in which the brake element exerts a first braking force upon the side gear to a second position in which the brake element exerts a second braking force upon the side gear, the second braking force being higher than the first braking force, wherein the actuation element is automatically movable between the first position and the second position responsive to rotation of the planet gear.

2. An inexpensive variable traction control differential for a low-speed vehicle having at least two axles, the differential comprising:
    a planet gear;
    a side gear meshed with the planet gear and coupled to an axle for rotation therewith;
    a brake element located adjacent at least one of the side gear and the axle;
    an actuation element simultaneously movable with side gear rotation from a first position in which the brake element exerts a first braking force upon the side gear to a second position in which the brake element exerts a second braking force upon the side gear, the second braking force being higher than the first braking force,
    wherein the brake element is movable along the axle into abutting relationship with the side gear.

3. The differential as claimed in claim 2, wherein the actuation element includes a bearing mounted for axial movement along the axle.

4. The differential as claimed in claim 2, wherein the brake element is a tubular member slidable along the axle.

5. An inexpensive variable traction control differential for a low-speed vehicle having at least two axles, the differential comprising:
    a planet gear;
    a side gear meshed with the planet gear and coupled to an axle for rotation therewith;
    a brake element located adjacent at least one of the side gear and the axle;
    an actuation element simultaneously movable with side gear rotation from a first position in which the brake element exerts a first braking force upon the side gear to a second position in which the brake element exerts a second braking force upon the side gear, the second braking force being higher than the first braking force; and
    a differential housing,
    wherein the actuation element includes a shaft in telescoping relationship with the axle, and wherein the actuation element is movable to shift the side gear with respect to the differential housing.

6. The differential as claimed in claim 5, wherein the side gear is movable by the shaft into abutting relationship with the brake element for frictionally engaging the side gear with the brake element.

7. The differential as claimed in claim 5, wherein the actuation element is a lever coupled to the actuation element for imparting axial force to the shaft.

8. The differential as claimed in claim 7, wherein the lever is actuatable through a range of positions bounded by the first and second positions, the range of positions corresponding to a range of braking forces exerted by the shaft upon the side gear.

9. An inexpensive variable traction control differential for a low-speed vehicle having at least two axles, the differential comprising:
    a planet gear;
    a side gear meshed with the planet gear and coupled to an axle for rotation therewith;
    a brake element located adjacent at least one of the side gear and the axle;
    an actuation element simultaneously movable with side gear rotation from a first position in which the brake element exerts a first braking force upon the side gear to a second position in which the brake element exerts a second braking force upon the side gear, the second braking force being higher than the first braking force,
    wherein the brake element is a brake pad against which the side gear rubs in the first and second positions of the actuation element.

10. The differential as claimed in claim 9, wherein the differential further comprises a differential housing and wherein the brake pad is coupled to an interior wall of the differential housing beside the side gear.

11. The differential as claimed in claim 9, wherein the lever is movable through a range of positions including the first and second positions to generate a corresponding range of frictional forces between the side gear and the brake pad.

12. An inexpensive variable traction control differential for a low-speed vehicle having at least two axles, the differential comprising:
    a planet gear;
    a side gear meshed with the planet gear and coupled to an axle for rotation therewith;
    a brake element located adjacent at least one of the side gear and the axle;
    an actuation element simultaneously movable with side gear rotation from a first position in which the brake element exerts a first braking force upon the side gear to a second position in which the brake element exerts a second braking force upon the side gear, the second braking force being higher than the first braking force,
    wherein the brake element is a friction element located adjacent a front face of the side gear.

13. The differential as claimed in claim 12, wherein the actuation element is coupled to the axle for movement of the axle and side gear toward and away from the friction element.

14. A method for controlling differential movement of a side gear in an inexpensive low-speed vehicle differential having at least one side gear and at least one planet gear driving the at least one side gear, the method comprising the steps of:
    orbiting the planet gear about a differential axis;
    rotating a side gear about the differential axis via a planet gear;
    initiating rotation of the planet gear about a pivot axis;
    actuating an actuation element in response to the step of initiating rotation of the planet gear about the pivot axis;
    generating a braking force upon at least one of the planet gear and the side gear via actuation of the actuation element; and
    adjusting the braking force during the step of orbiting the planet gear about the differential axis,
    wherein the step of generating a braking force upon the side gear includes applying a frictional braking force against a surface of the side gear.

15. The method as claimed in claim 14, wherein the differential further includes an axle coupled to and driven by the side gear, the method further comprising the step of axially shifting a brake element along the axle and into abutting frictional engagement with the surface of the side gear to apply the frictional braking force against the surface of the side gear.

16. The method as claimed in claim 14, further comprising the step of frictionally engaging the surface of the side gear against a surface of the differential which is stationary with respect to the side gear.

17. The method as claimed in claim 16, wherein the differential further includes an axle coupled to and driven by the side gear, and wherein the step of frictionally engaging the surface of the side gear includes the step of axially shifting the axle to axially shift the side gear with respect to the surface of the differential.

18. The method as claimed in claim 16, wherein the differential further includes a differential housing, and the surface of the differential is an interior surface of the differential housing.

19. A method for controlling differential movement of a side gear in an inexpensive low-speed vehicle differential having at least one side gear and at least one planet gear driving the at least one side gear, the method comprising the steps of:

orbiting the planet gear about a differential axis;

rotating a side gear about the differential axis via a planet gear;

initiating rotation of the planet gear about a pivot axis;

actuating an actuation element in response to the step of initiating rotation of the planet gear about the pivot axis;

generating a braking force upon at least one of the planet gear and the side gear via actuation of the actuation element; and adjusting the braking force during the step of orbiting the planet gear about the differential axis, wherein the differential further includes an axle coupled to and driven by the side gear, the axle having an axial aperture defined therein within which is received a brake shaft having an end portion, the method further comprising the step of axially shifting the brake shaft in the axial aperture to shift the side gear with respect to a housing of the differential.

20. The method as claimed in claim 19, wherein the step of axially shifting the brake shaft includes frictionally engaging a surface of the side gear with a brake element.

21. The method as claimed in claim 19, wherein the braking force is adjustable through a range of braking forces proportional to axial force applied to the brake shaft, the step of adjusting the braking force including adjusting the axial force applied to the brake shaft.

22. A method for controlling differential movement of a side gear in an inexpensive low-speed vehicle differential having at least one side gear and at least one planet gear driving the at least one side gear, the method comprising the steps of:

orbiting the planet gear about a differential axis;

rotating a side gear about the differential axis via a planet gear;

initiating rotation of the planet gear about a pivot axis;

actuating an actuation element in response to the step of initiating rotation of the planet gear about the pivot axis;

generating a braking force upon at least one of the planet gear and the side gear via actuation of the actuation element; and adjusting the braking force during the step of orbiting the planet gear about the differential axis, wherein the differential further includes a brake pad located adjacent the side gear and wherein the step of generating a braking force upon the side gear includes the step of frictionally engaging the surface of the side gear against the brake pad.

* * * * *